(12) United States Patent
Green

(10) Patent No.: US 8,186,110 B2
(45) Date of Patent: May 29, 2012

(54) TRANSPORTABLE, MODULAR, SELF CONTAINED SHIPPING CONTAINER BUILDING

(76) Inventor: James E Green, Mill Creek, WA (US)

( * ) Notice: Subject to any disclaimer, the term of this patent is extended or adjusted under 35 U.S.C. 154(b) by 159 days.

(21) Appl. No.: 12/178,377

(22) Filed: Jul. 23, 2008

(65) Prior Publication Data

US 2010/0018131 A1     Jan. 28, 2010

(51) Int. Cl.
   *E04H 1/00*   (2006.01)
(52) U.S. Cl. ........................................................ 52/79.9
(58) Field of Classification Search ............... 52/79.5, 52/79.9, 79.12
   See application file for complete search history.

(56) References Cited

U.S. PATENT DOCUMENTS

| | | | | |
|---|---|---|---|---|
| 4,891,919 A | * | 1/1990 | Palibroda | 52/79.5 |
| 5,447,000 A | * | 9/1995 | Larsen | 52/79.1 |
| 5,950,373 A | * | 9/1999 | von Hoff et al. | 52/79.5 |
| 2003/0009954 A1 | * | 1/2003 | Bradley | 52/79.1 |
| 2007/0074463 A1 | * | 4/2007 | Ziegelman | 52/79.1 |
| 2007/0163184 A1 | * | 7/2007 | Olesch | 52/79.5 |
| 2007/0271857 A1 | * | 11/2007 | Heather et al. | 52/79.9 |
| 2009/0000213 A1 | * | 1/2009 | Coopman | 52/79.5 |

FOREIGN PATENT DOCUMENTS

| | | |
|---|---|---|
| WO | WO 96/30601 | 10/1996 |
| WO | WO 2005/007540 | 1/2005 |

* cited by examiner

*Primary Examiner* — Branon Painter
(74) *Attorney, Agent, or Firm* — Priya Sinha Cloutier

(57) ABSTRACT

A transportable, modular, self-contained shipping container building which has an optional means to collect, store, and distribute power from natural resources and a means to collect store, distribute and/or purify potable and/or non-potable water.

12 Claims, 26 Drawing Sheets

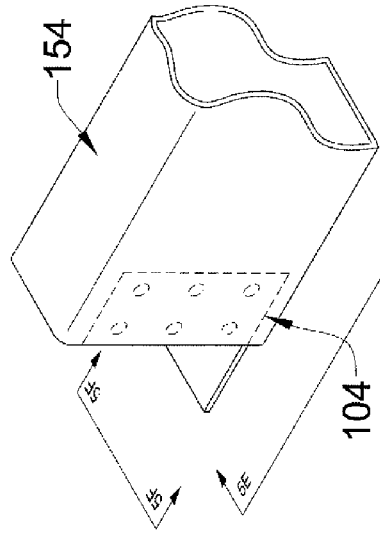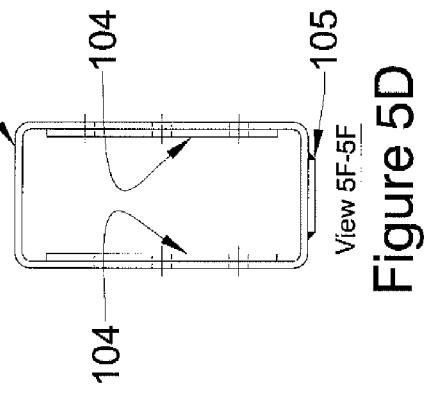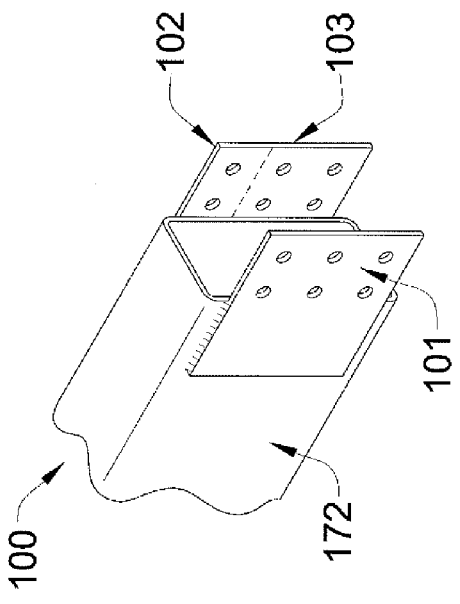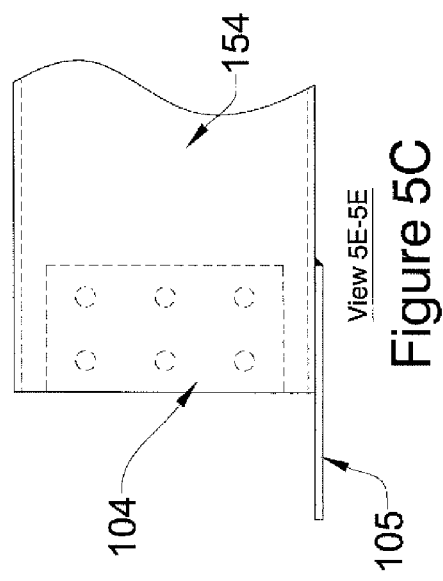
Figure 5

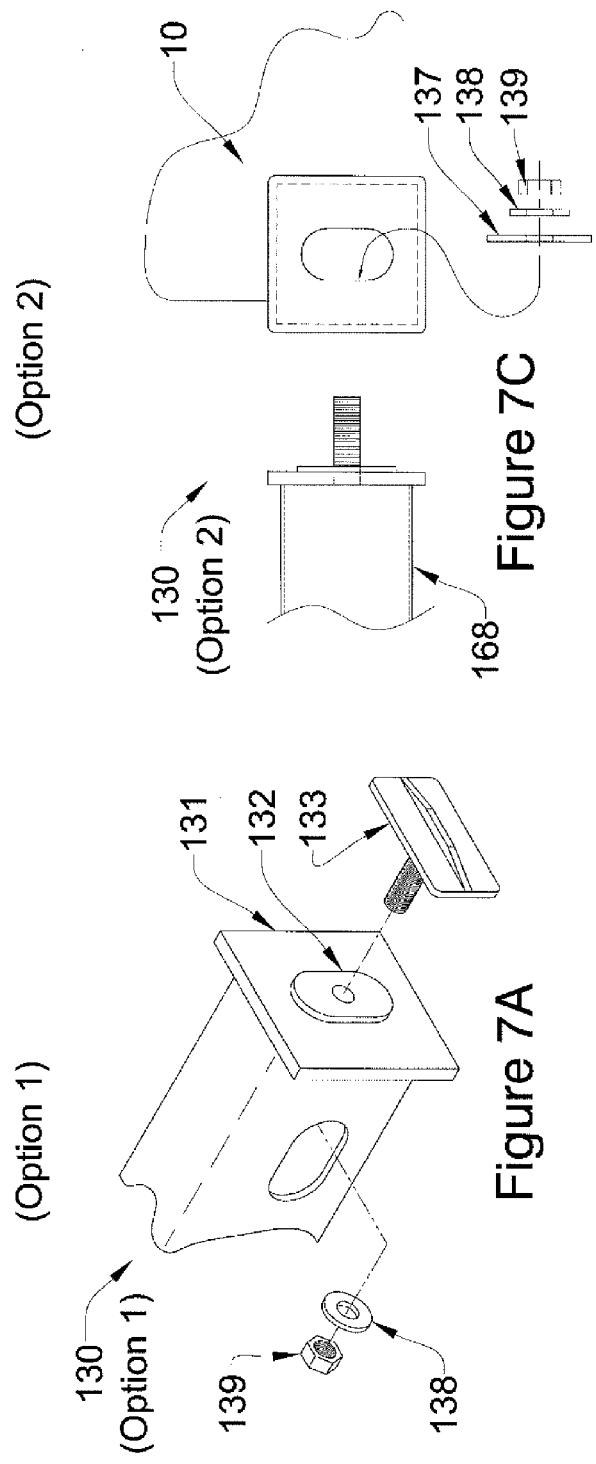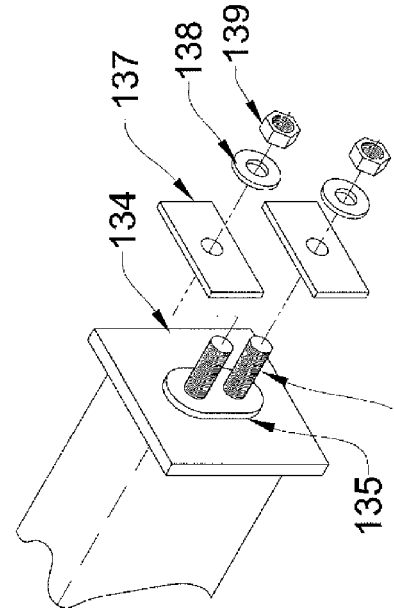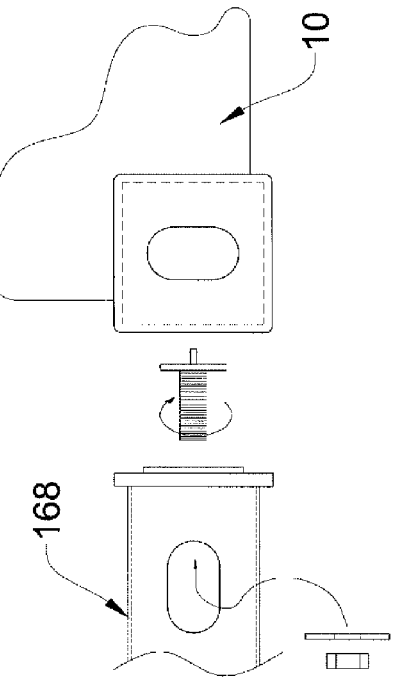
Figure 7

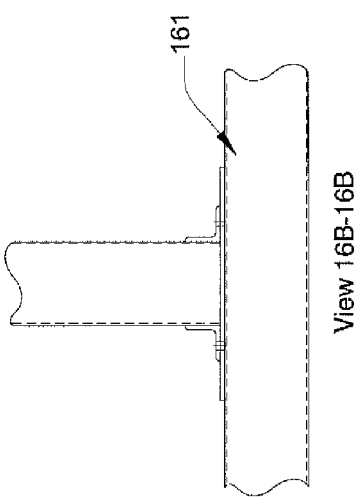
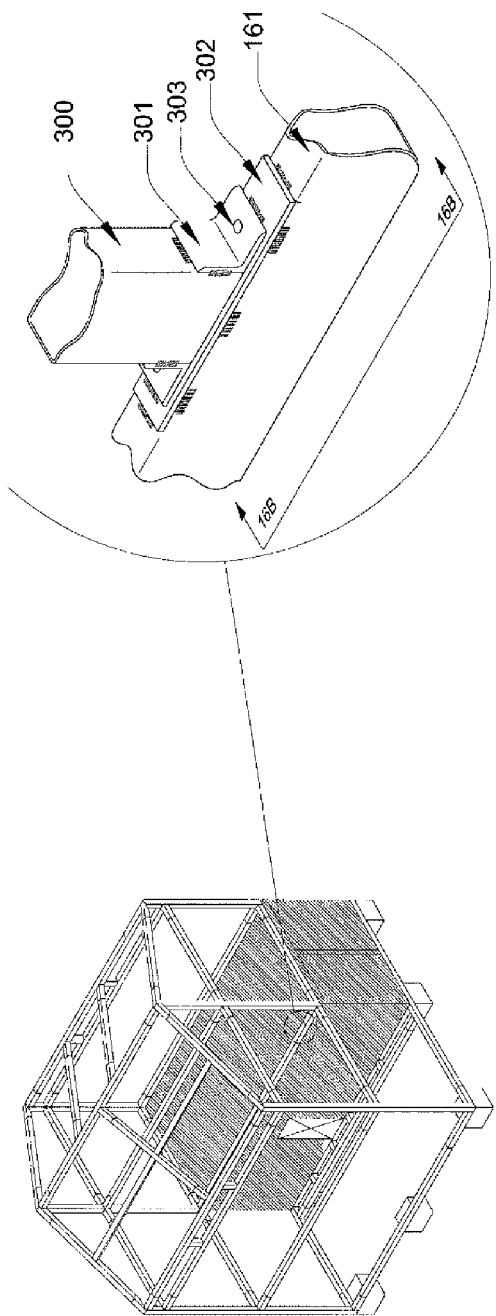
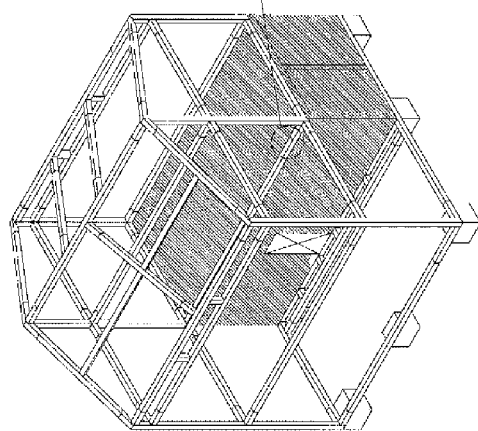
Figure 16A
View 16B-16B
Figure 16

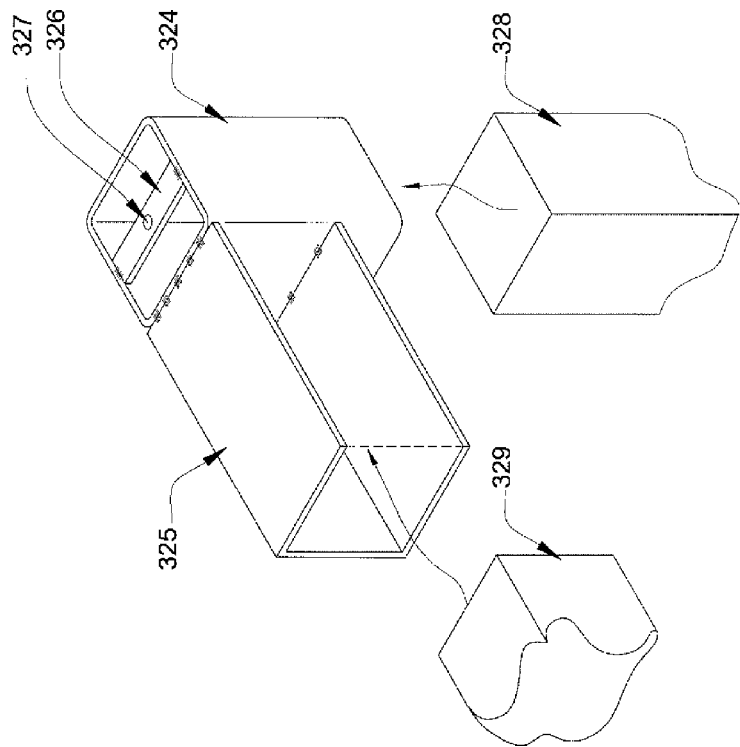
Figure 17C
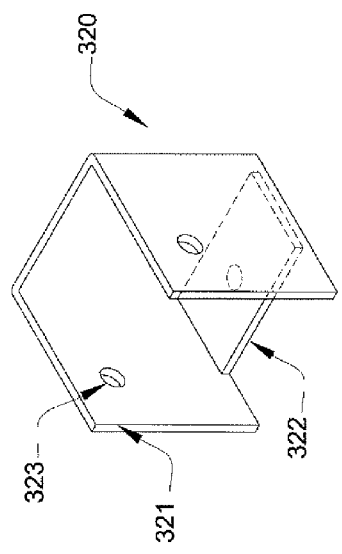
Figure 17A
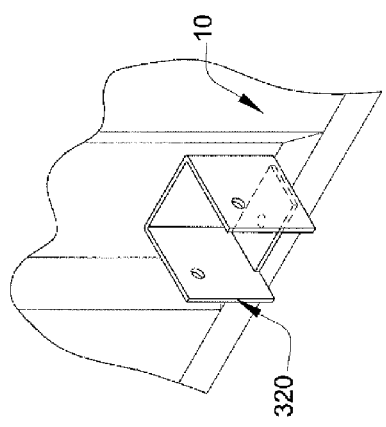
Figure 17B
Figure 17

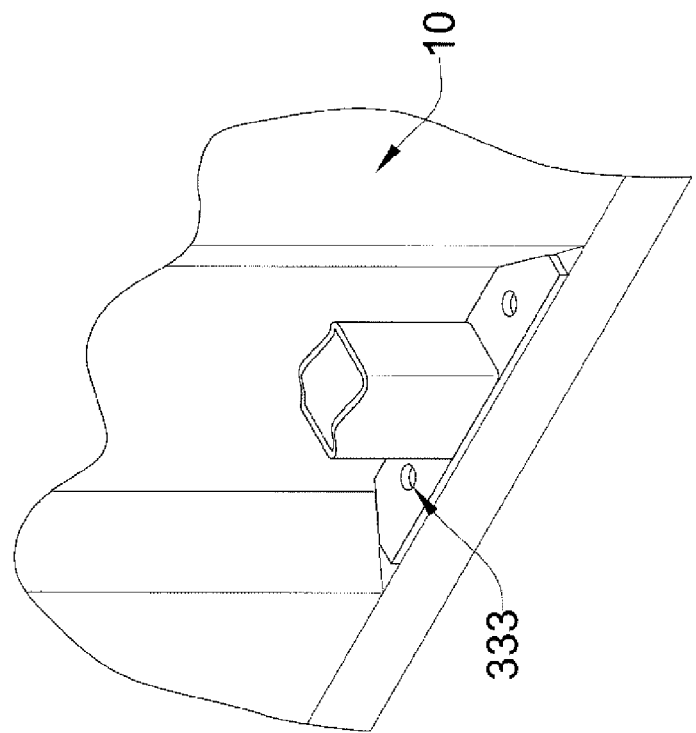
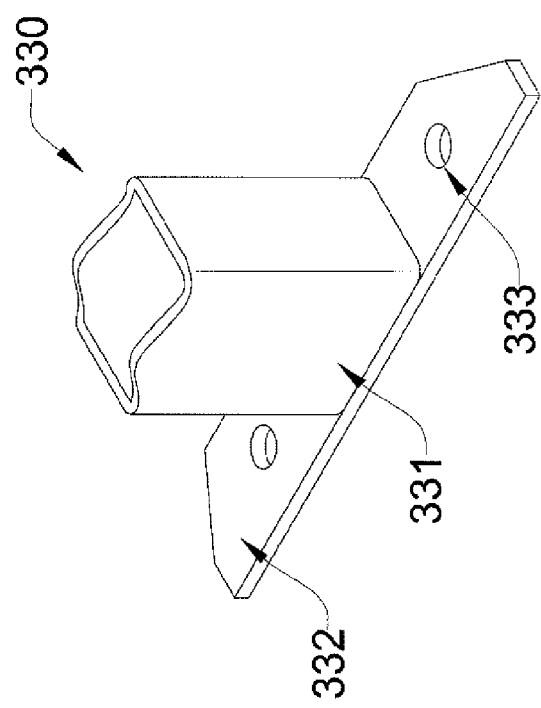
Figure 18A
Figure 18B
Figure 18

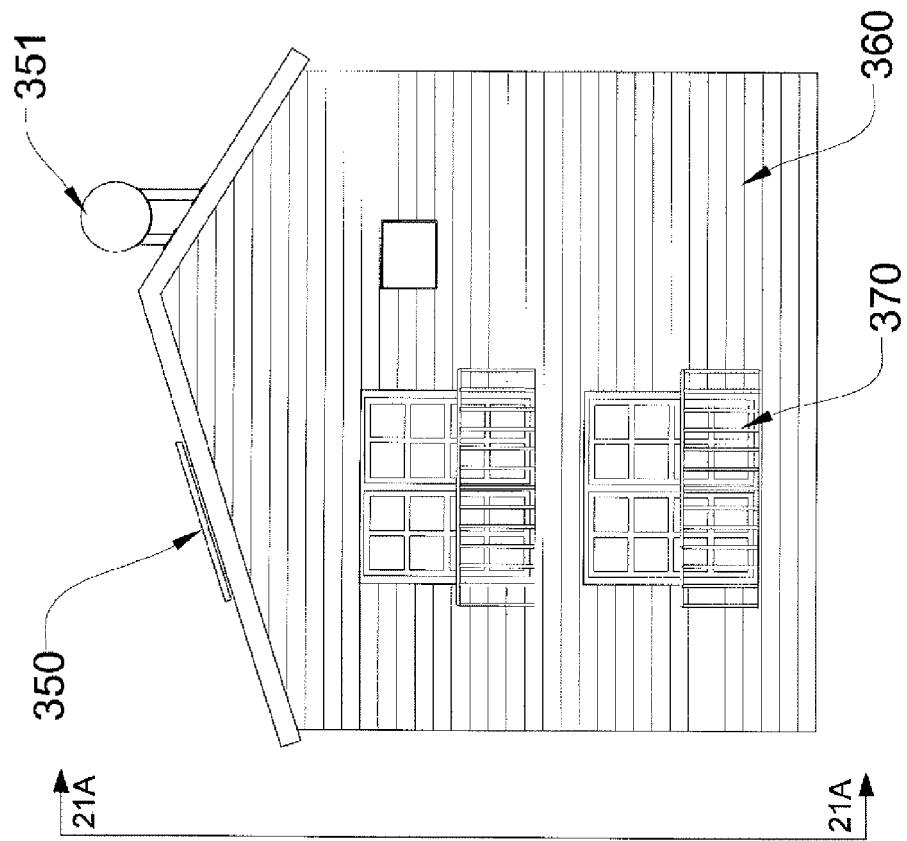
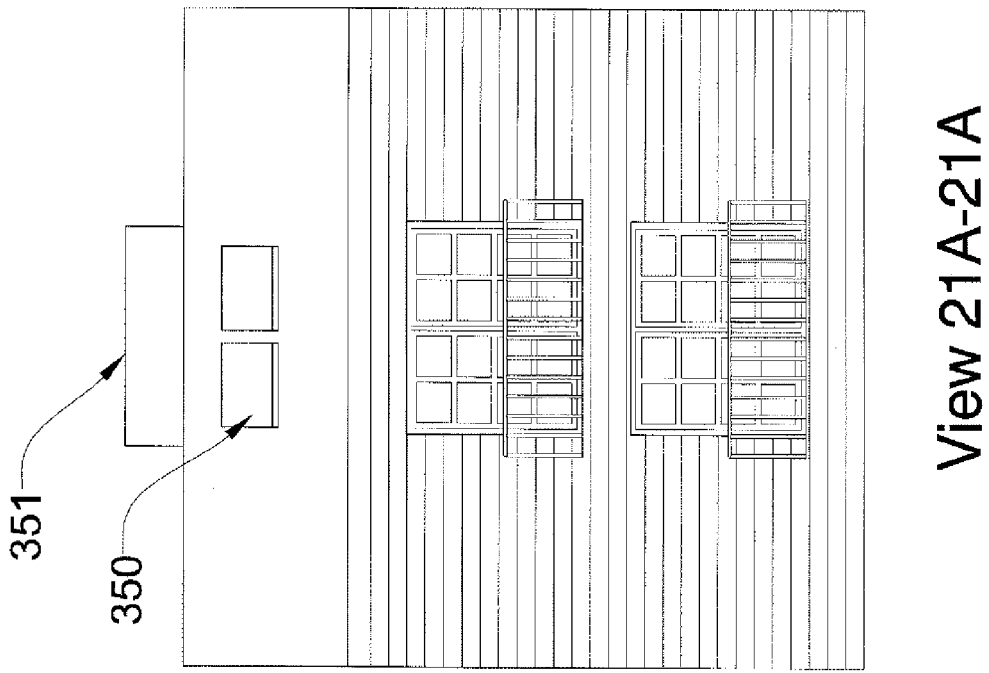
View 21A-21A
Figure 21

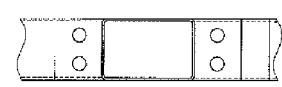  
View 23A     View 23B     View 23C
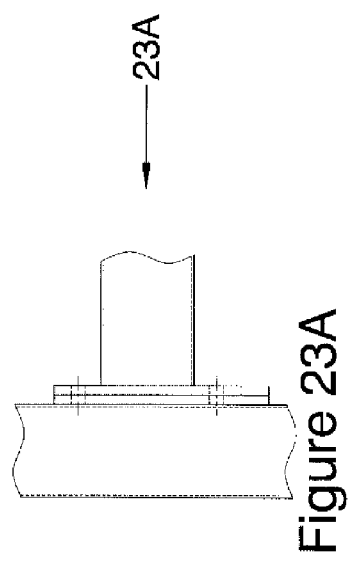 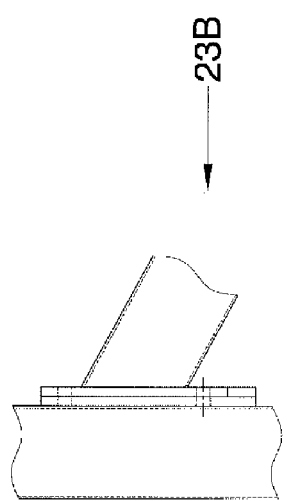 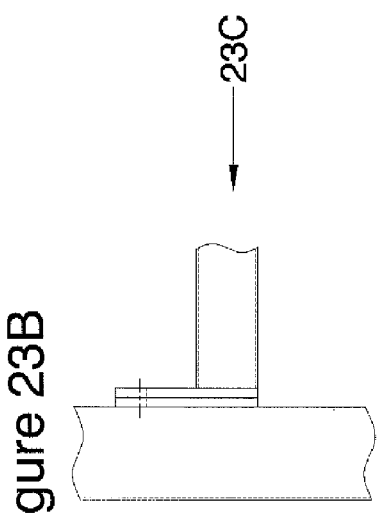
Figure 23A     Figure 23B     Figure 23C
Figure 23

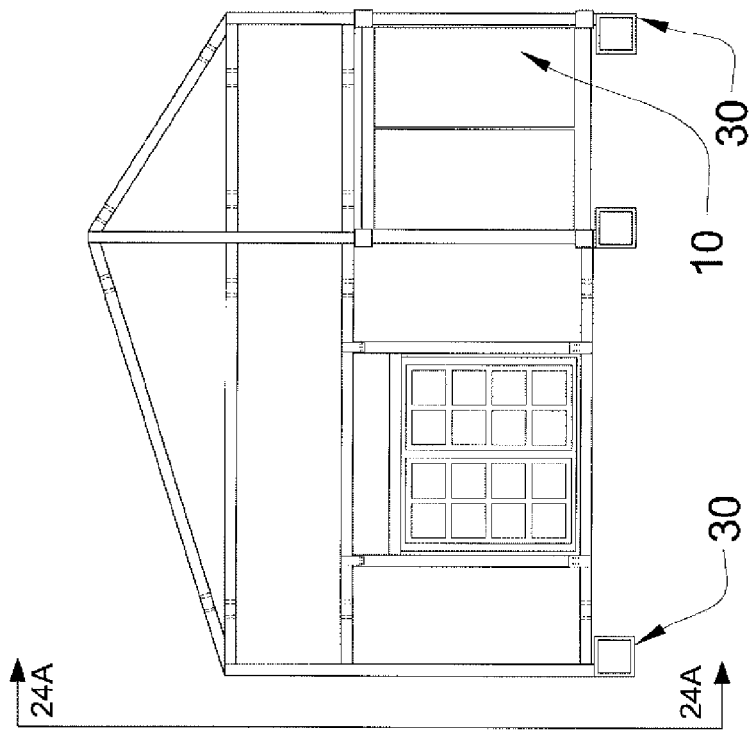
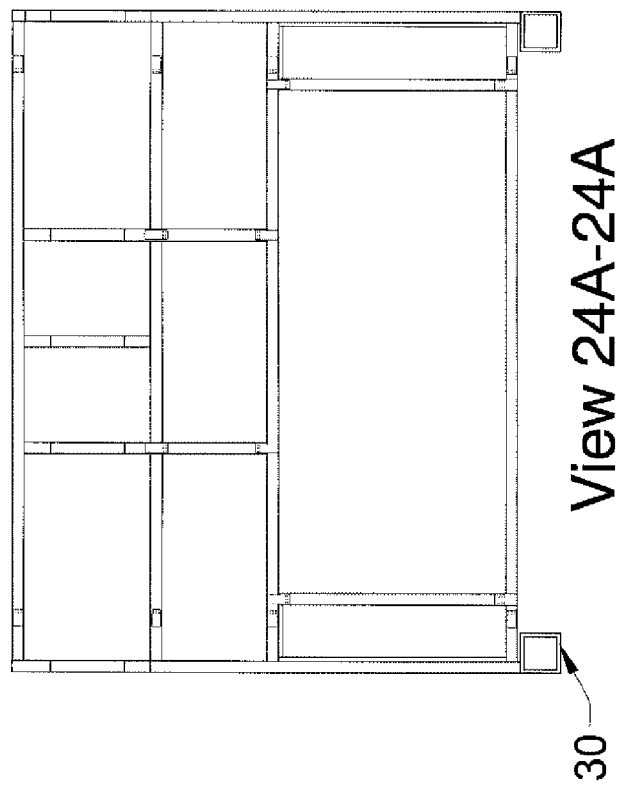
Figure 24

TRANSPORTABLE, MODULAR, SELF CONTAINED SHIPPING CONTAINER BUILDING

CROSS-REFERENCES TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND

This invention relates to a transportable, modular building ("Building") utilizing a shipping container as the building foundation and means of transportation.

In today's industrial environment it is common place to utilize the benefits of a lower cost manufacturing base, transporting goods to the location they are required; an example of this is found in the aircraft industry. The aircraft industry, in Europe and America, have components and subassemblies manufactured in countries all over the world. Once manufactured, the components and subassemblies are shipped, by means of shipping container and other transport mediums, to a central location where the aircraft are assembled and certified.

The shipping container has become a standard medium in the international (and national) transportation of goods and is amongst the most cost effective forms of national and overseas transportation. By design, the shipping containers are readily transportable and have a sound structural integrity.

As a result of globalization, new and used shipping containers are readily available in most countries. There are times when a company or corporation has excess shipping containers because it is not cost effective to return empty containers to their origin. Consequently, there are unused shipping containers throughout the world.

The current invention was developed from an idea to design and build a transportable, modular building" capable of taking advantage of a low cost manufacturing base for both material and labor, along with being readily transportable. The idea of having transportable, modular buildings has become an important concept throughout the world. Transportable, modular buildings can be placed in almost any location where there is a need for housing, offices, garages, restrooms, workshops, boat houses, emergency gathering places, shops, among others.

Creating Buildings from shipping containers have many benefits including cost, strength, durability and most importantly ease of transportation, with a world wide transportation infrastructure already in place. As mentioned above, there are many used containers available at a cost that is relatively low in comparison to conventional labor-intensive materials for construction such as timber or brick and mortar; such traditional construction may also require larger more expensive foundations. A quick search on the World Wide Web shows standard size new and used shipping containers are readily available and are relatively inexpensive, prices are dependant on location.

Standard shipping containers are governed by design requirements. For example, International Standard Organization ("ISO") Specification 1496-1 'Series 1 Freight Containers—Specification and Testing' defines design requirements ensuring that a shipping container is capable of carrying the required loading, within the dimensional tolerances with standardized pick-up locations and durable. The operational environment of a shipping container requires the container to be: fully functional in hot and cold temperature extremes, water tight, resistant to salt water, high winds, and abuse loading. Shipping Containers are inherently fire resistant because of their steel construction.

The basis for using a shipping container in the current invention was to utilize an international standard unit that could be easily shipped around the world on a number of transport devices. Another reason to use the shipping container was the 'environmentally friendly' aspect, a used shipping container if not utilized would have to be recycled, requiring energy to accomplish. The current invention will also incorporate 'eco friendly' materials and methods of power generation by using re-cycled materials such as recycled rubber tires for roofing tiles, recycled paper for insulation and natural resources where feasible and cost effective.

Generally, when evaluating a building, one looks are three criteria: structure (i.e. can it hold up to the elements); utility (i.e. will it serve the purpose it was built for); and aesthetic quality (i.e. is it pleasing to look at). Current shipping container designs appear to be structurally sound and serve the purpose for which they are made; however, many of them lack an aesthetic quality.

Information relevant to attempts to address the aforementioned problems can be found in: Minkkinen, U.S. Pat. No. 6,513,670 (Feb. 4, 2003); Wiley U.S. Pat. No. 5,706,614 (Jan. 13, 1994); Palibroda, U.S. Pat. No. 4,891,919 (Jan. 9, 1990); DiMartino, U.S. Pat. No. 4,599,829 (Jul. 15, 1986). However, each of these references suffers from one or more of the following disadvantages:

(1) aesthetically displeasing in that they look like shipping container, shipping containers attached to each other; or shipping containers stacked one on top of the other;
(2) usable space is limited to usable volume inside the shipping container;
(3) requires major modifications to the shipping container which may reduce the structural integrity;
(4) cost of major modification to shipping container increases cost of building;
(5) electrical and plumbing systems not self contained;
(6) once placed in situ, the shipping container structure cannot be relocated.

The purpose of this invention is to use at least one shipping container to form a Building; at least one shipping container will be shipped containing the main components necessary to assemble a Building. The Building will be shipped by water, land and air consequently, it is important for the shipping container to maintain its structural integrity; its integrity being one of the primary reasons to use the container. Therefore, another object of the current invention is to maintain the structural integrity of the shipping container by leaving the walls intact. Reinforcement will be incorporated around any cut-outs while the container is at the assembly location.

Furthermore, because it is envisioned that the current invention can be used in even the most remote locations or in areas where disaster has caused traditional electrical and water system to become non-existent, another purpose of the Building is to provide shelter that has an optional self contained electrical and plumbing system. The current invention is a Building using at least one shipping container that is aesthetically pleasing with optional exterior finishing. That is, it does not merely look like a shipping container that has holes cut into it or as a group of shipping container in series, parallel or stacked configurations.

BRIEF SUMMARY OF THE INVENTION

A transportable, modular building which has an optional means to harvest, store, and distribute power from natural resources and an optional means to harvest, store, distribute and/or purify potable and/or non-potable water.

BRIEF DESCRIPTION OF THE SEVERAL VIEWS OF THE DRAWINGS

Other features and advantages of the present invention will become apparent in the following detailed descriptions of the preferred embodiment with reference to the accompanying drawings, of which FIGS. '1' through '22' show the preferred embodiment and FIGS. '24' through to '26' show alternative configurations.

FIG. 5: Detailed view of a typical horizontal/sloped beam splice joint.

FIG. 7: Detail View of a typical container attachment joints—Options 1 and 2.

FIG. 16. Exploded view of typical internal wall/door support structure member.

FIG. 17: Exploded view of typical 'Container' internal paneling support structure attachment FIG. 18: Detail view of typical 'Container' internal vertical support member for cutouts.

FIG. 21: Front and side view on preferred embodiment with optional finish.

FIG. 23: Detail view of examples of modular building extension joints.

FIG. 24. Front and side view showing 'garage or single story' optional modular building.

DETAILED DESCRIPTION OF THE INVENTION

Figure 1:
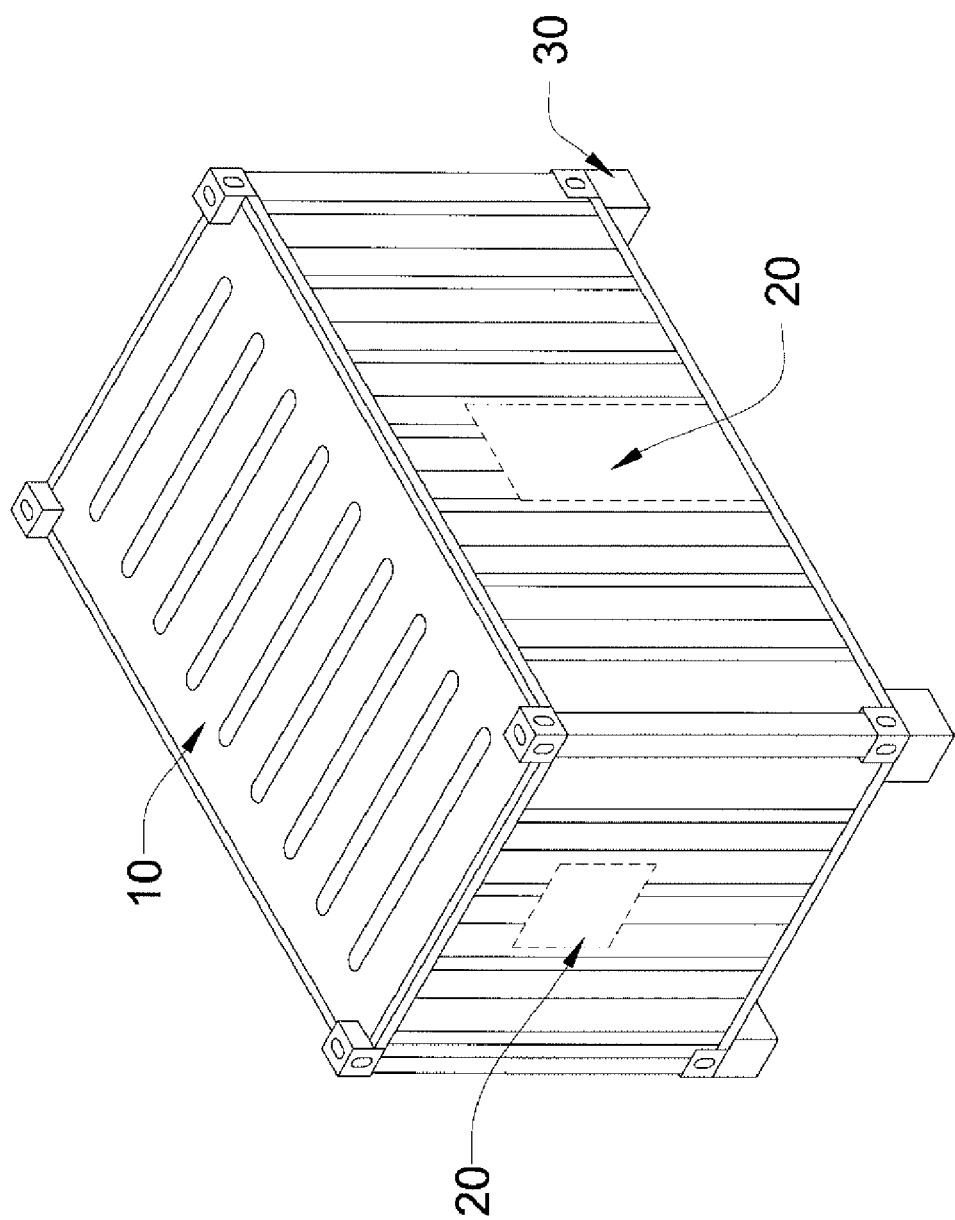
FIG. 1: Isometric view showing Shipping container on support Blocks.
Figure 2:
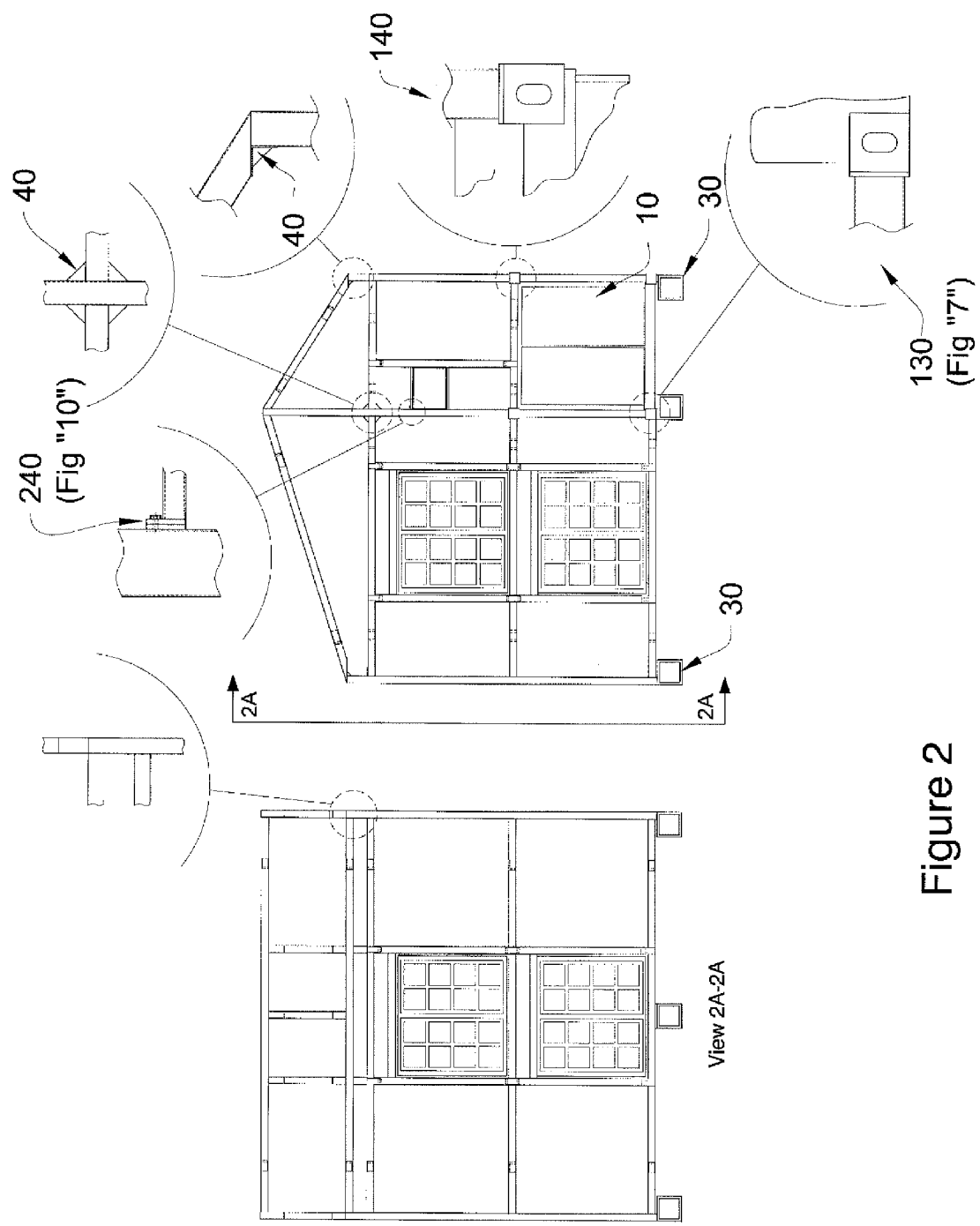
FIG. 2: Front and Side view of preferred embodiment—container and extending structure.
Figure 3:
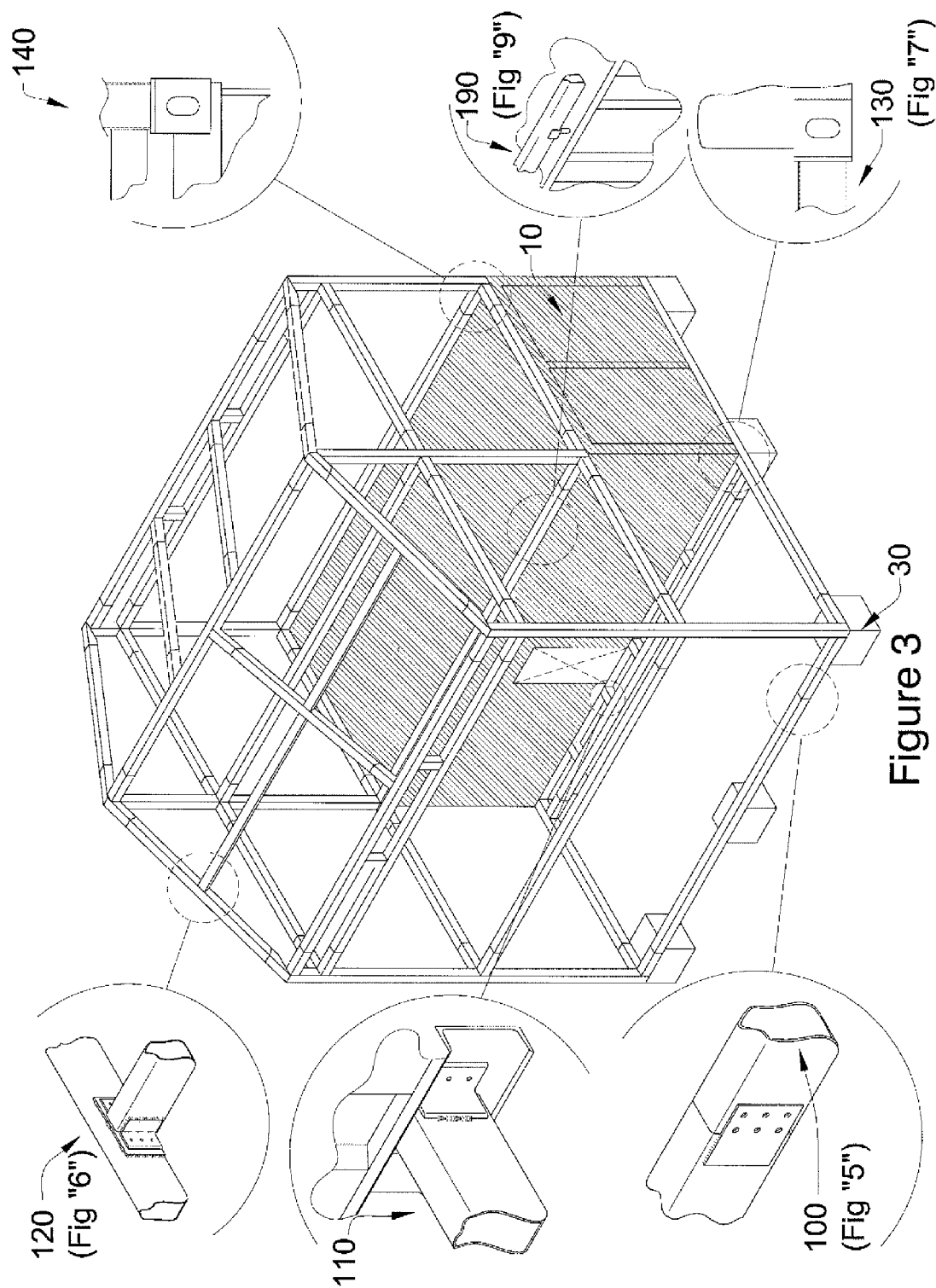
FIG. 3: Isometric view showing container and extension main support structure.
Figure 4:
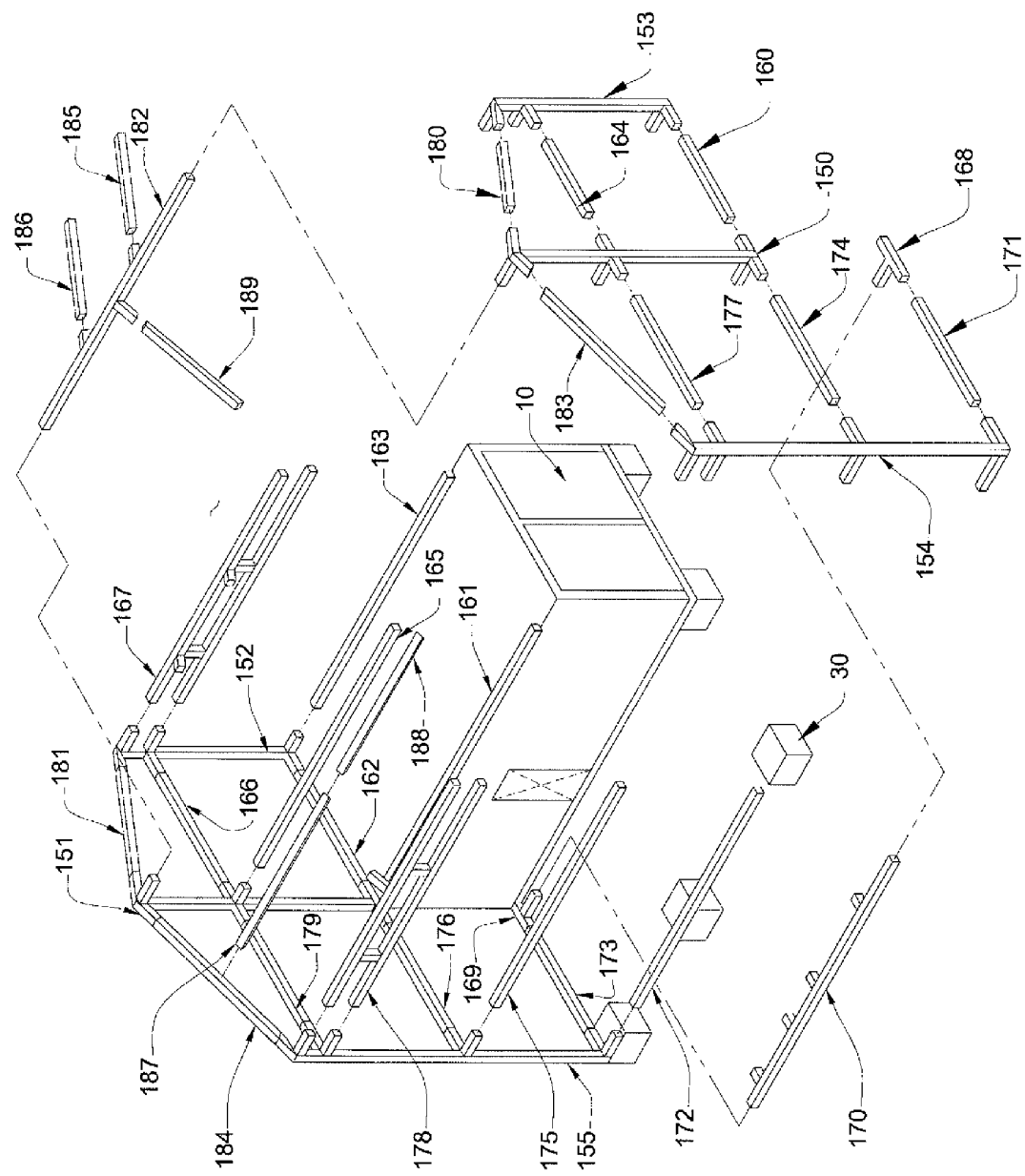
FIG. 4: Exploded view of FIG. 3 showing mains structural members.
Figure 6:
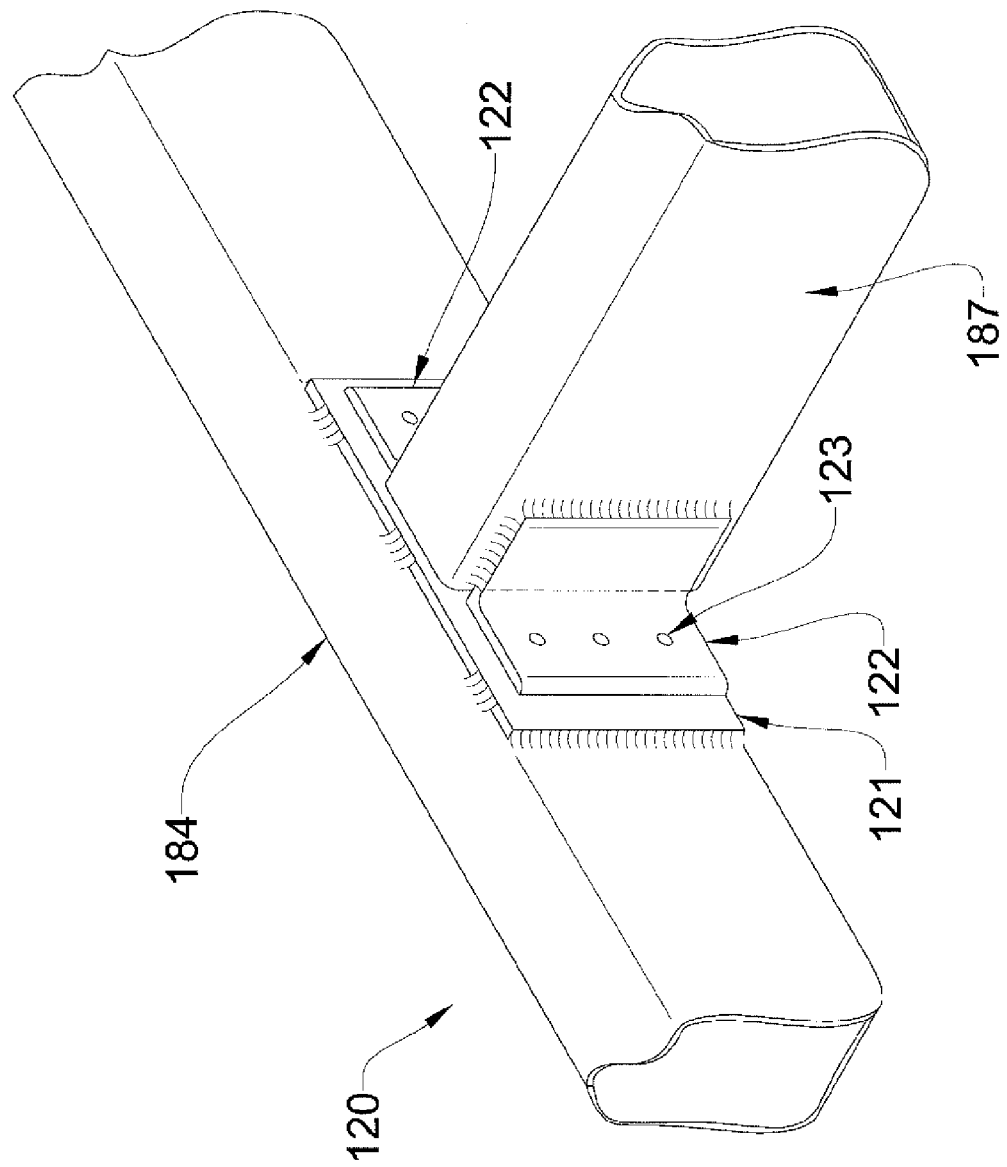
FIG. 6: Elevation view of a typical floor, ceiling and roof beam attachment Joint.
Figures 8, 8A, 8B, 8C:
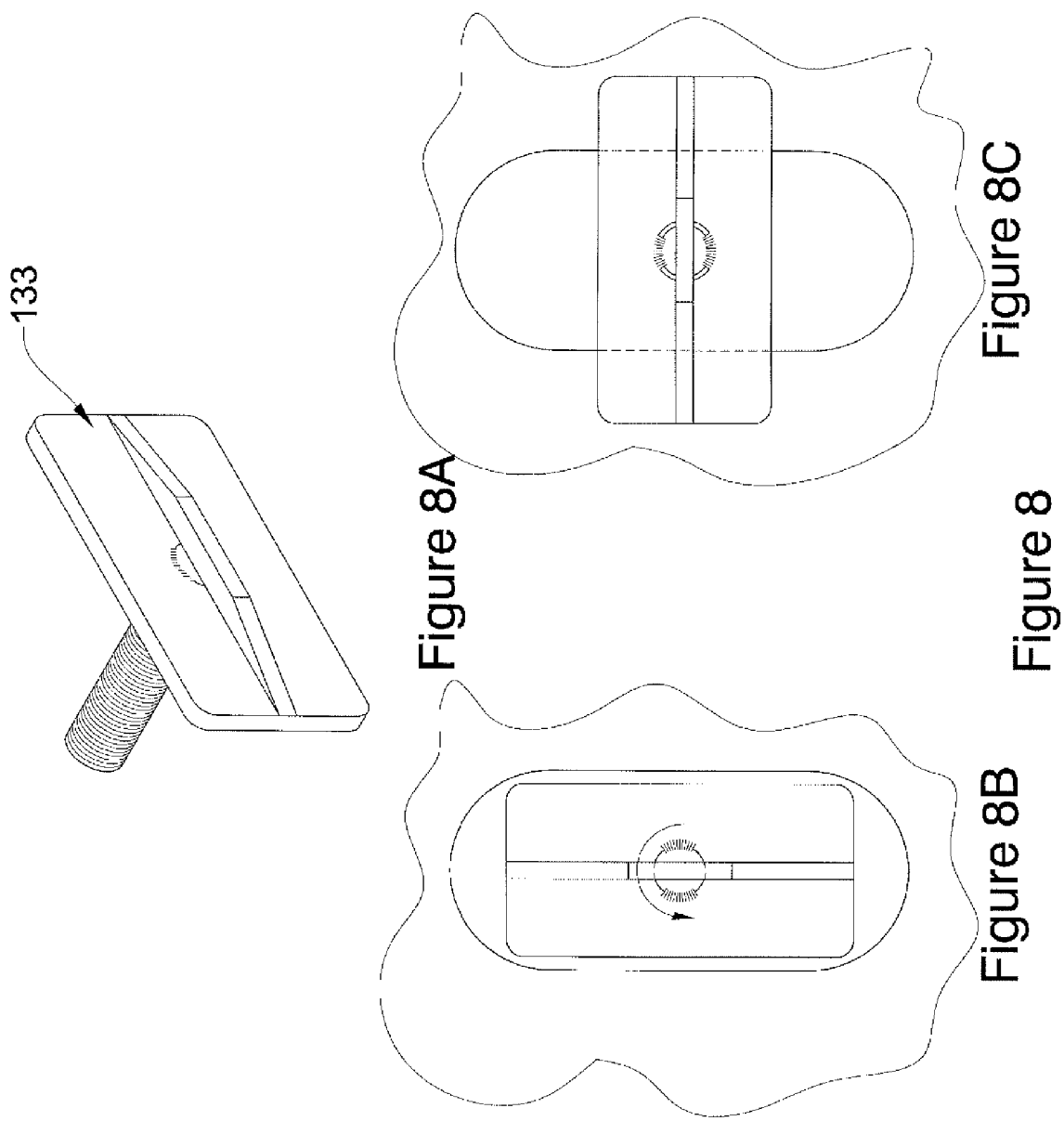
FIG. 8: Detailed views showing installation of Item 133 in FIG. 7.
Figure 9:
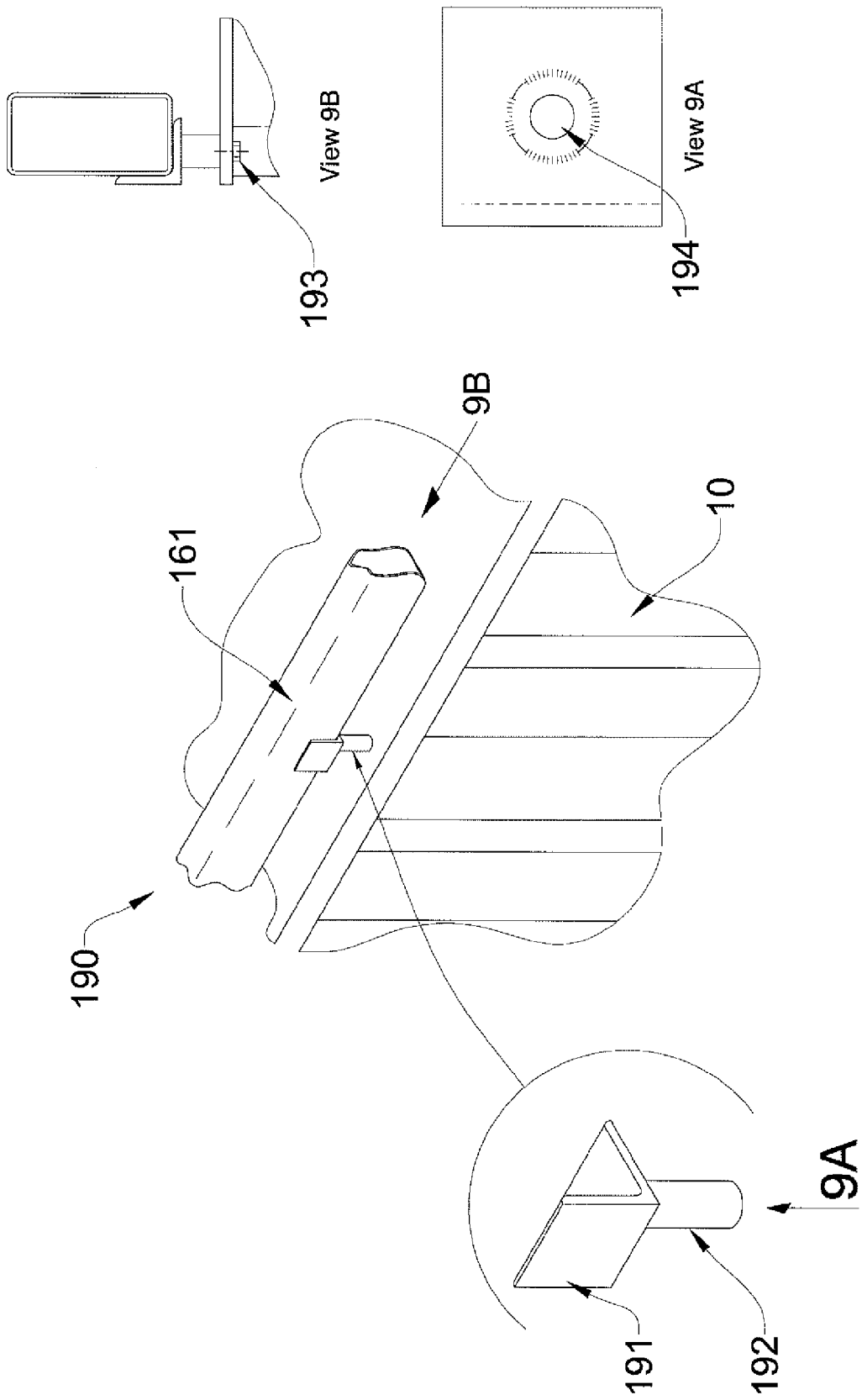
FIG. 9: Detailed and exploded view of a typical attachment of the horizontal beam on top f the container to the container (to reduce un-supported beam length).
Figure 10:
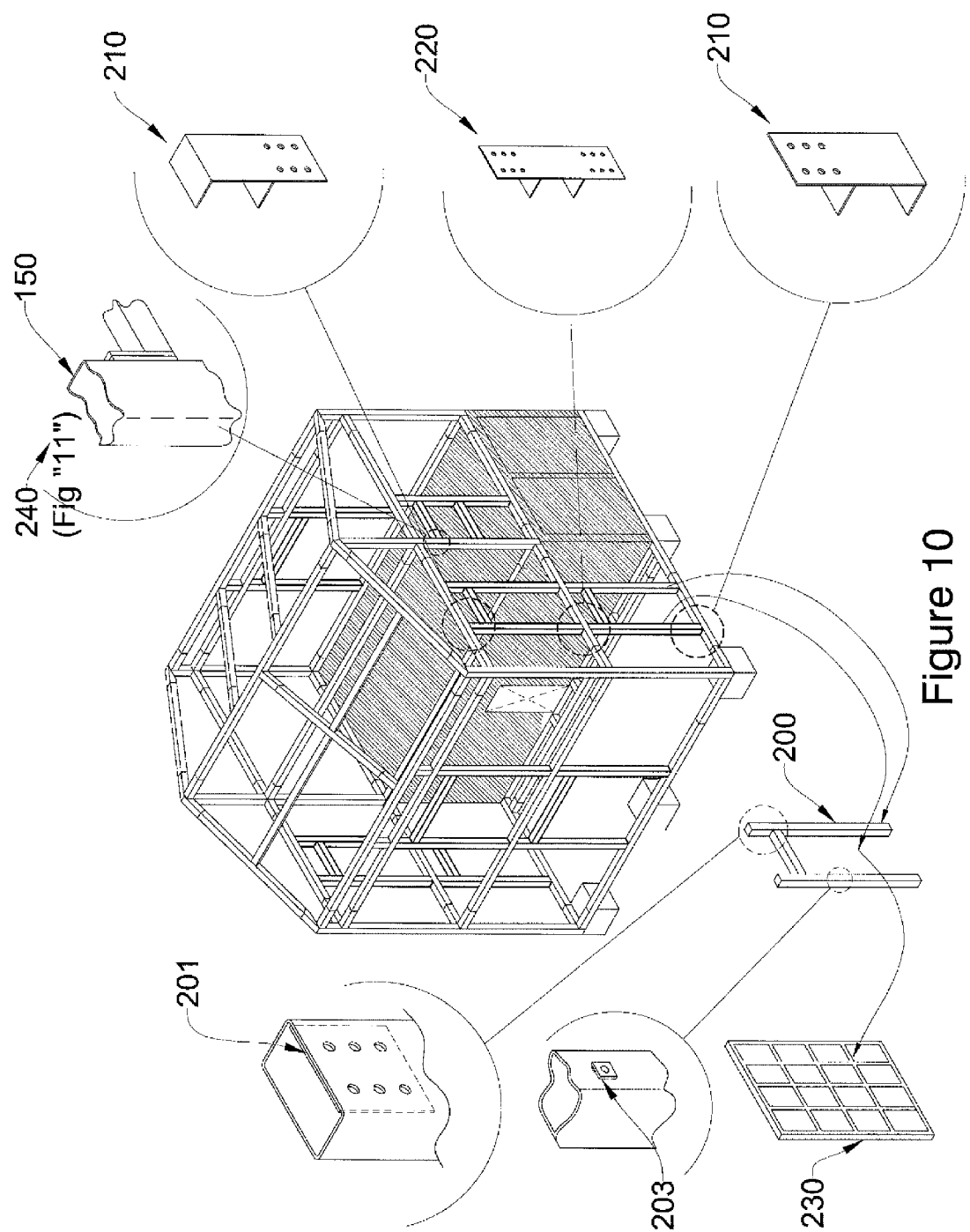
FIG. 10: Exploded view of typical window/door support structure.
Figure 11:
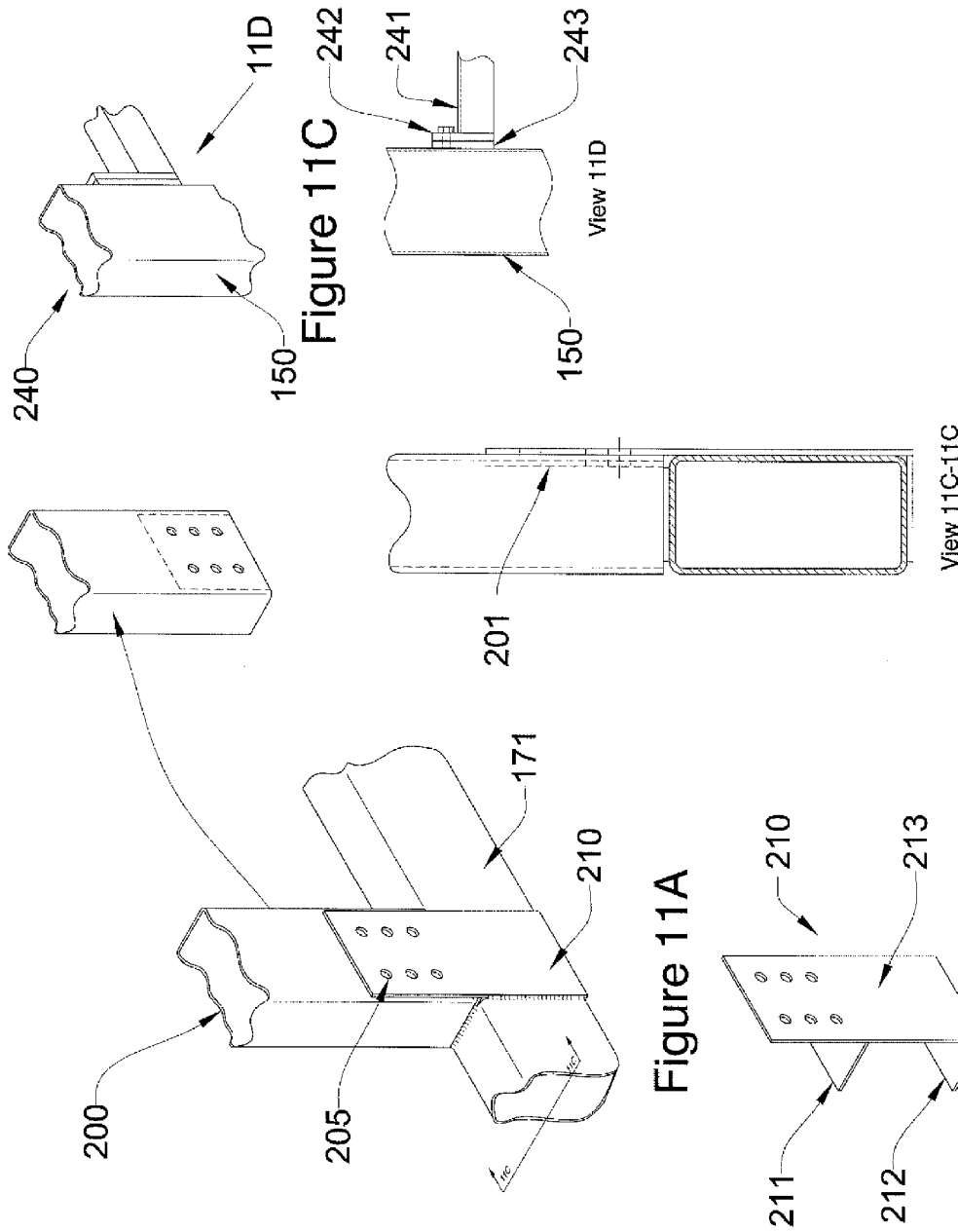
FIG. 11: Detailed view of typical window/door support structure attachment details.
Figure 12:
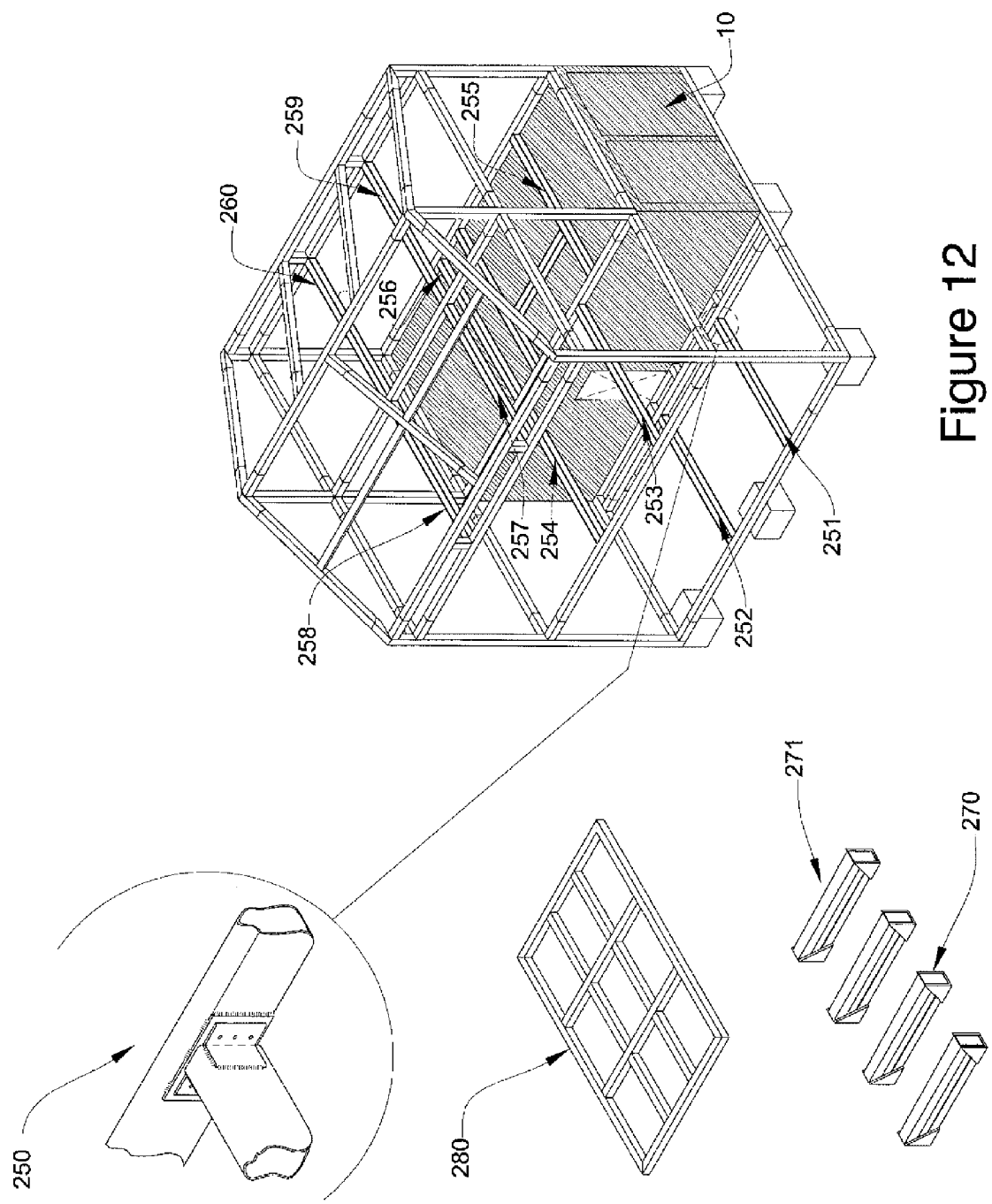
FIG. 12: Exploded view of floor beam and two floor panel support structure options
Figure 13:
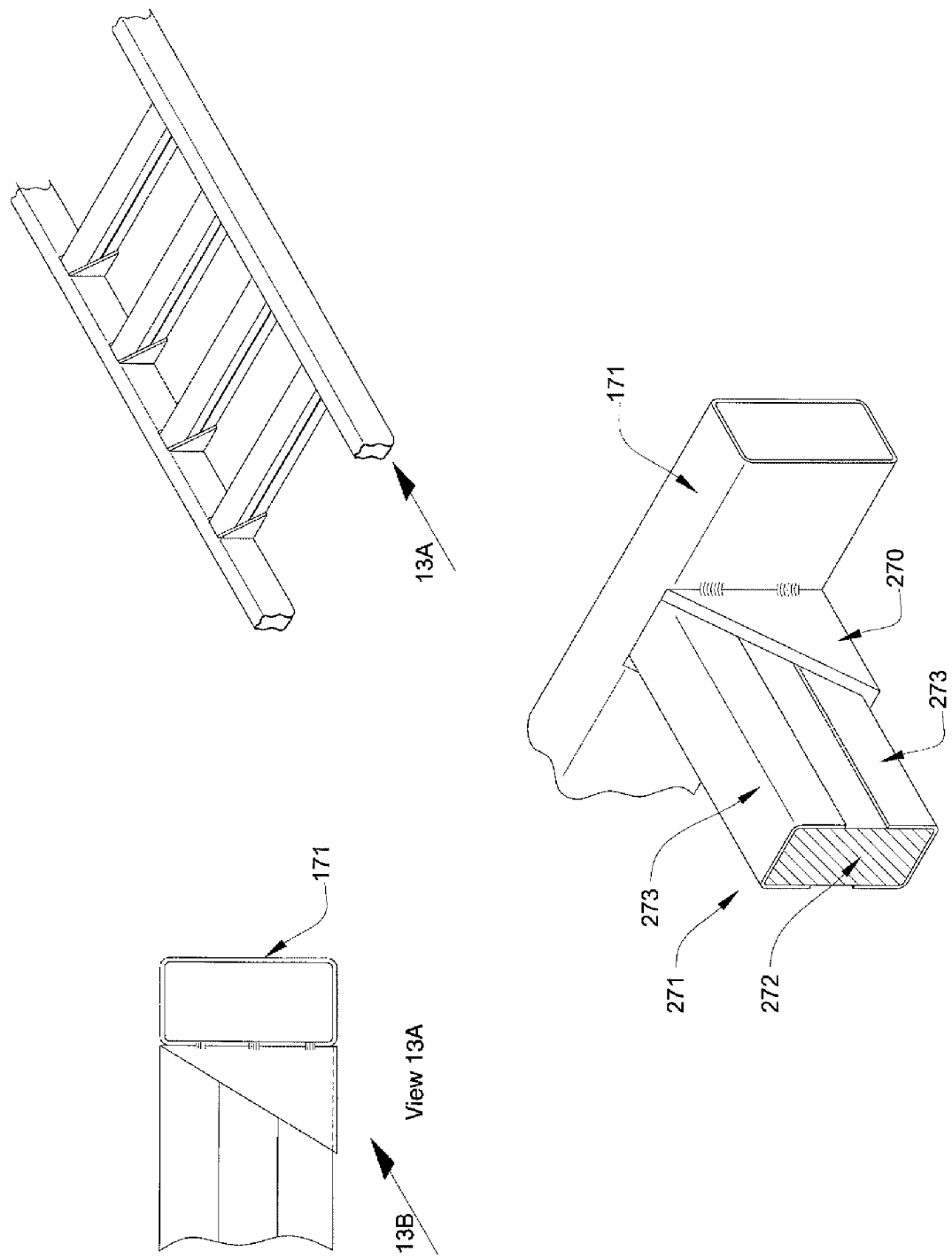
FIG. 13: Detail view of floor panel support structure—Option 1.
Figure 14:
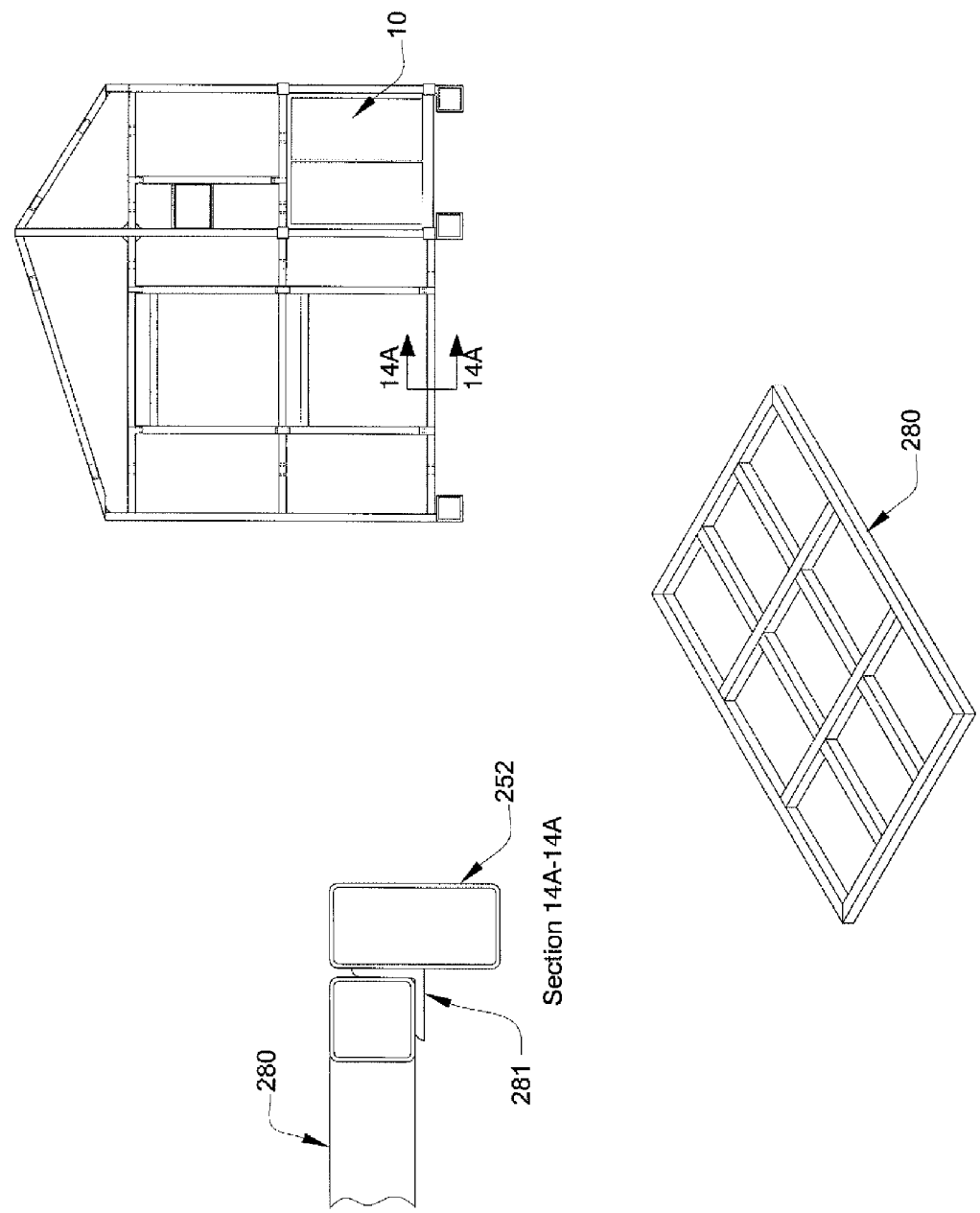
FIG. 14: Detail view of floor panel support structure—Option 2.
Figure 15:
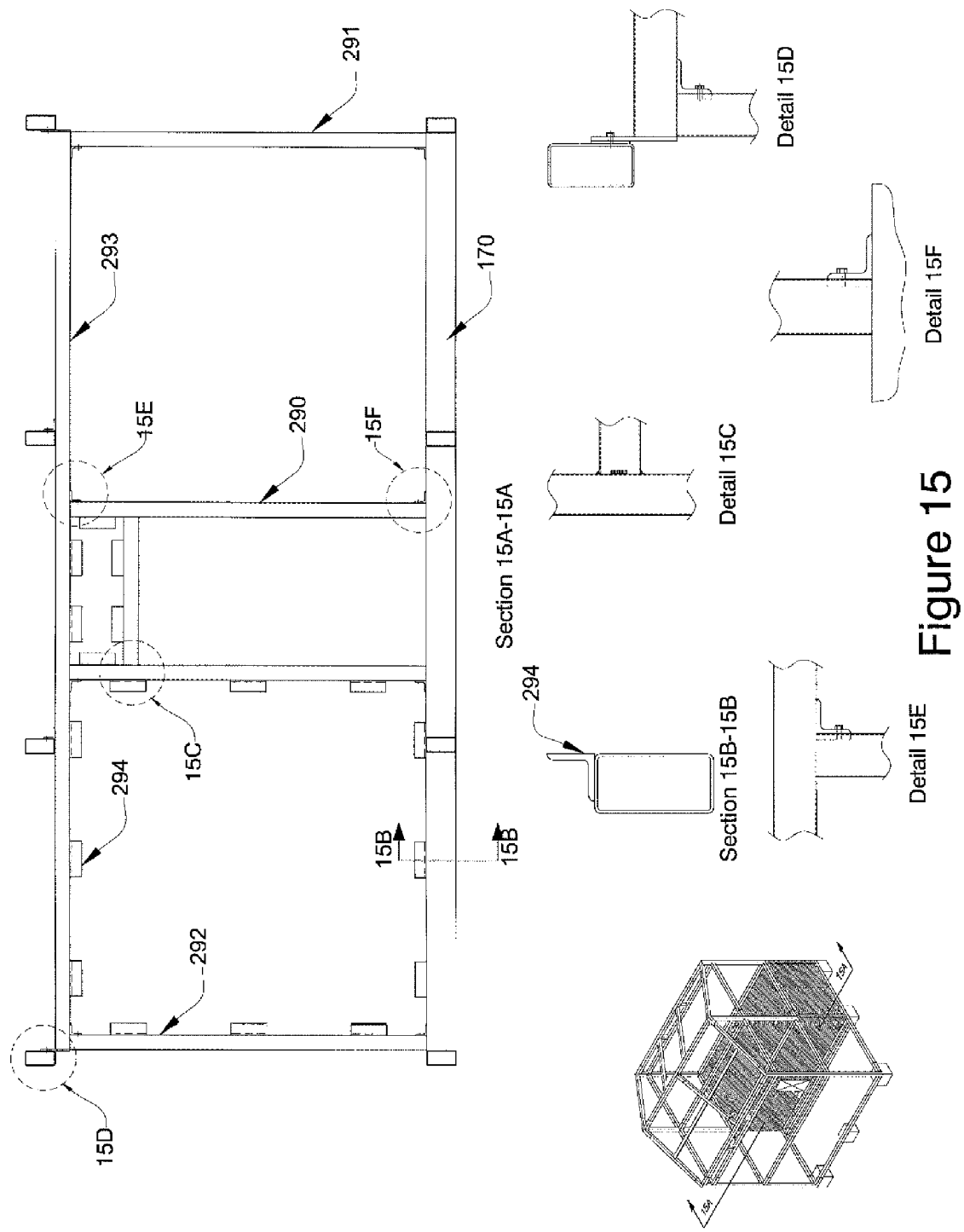
FIG. 15: Exploded view of sidewall support structure for paneling covering shipping container corrugations.
Figure 19:
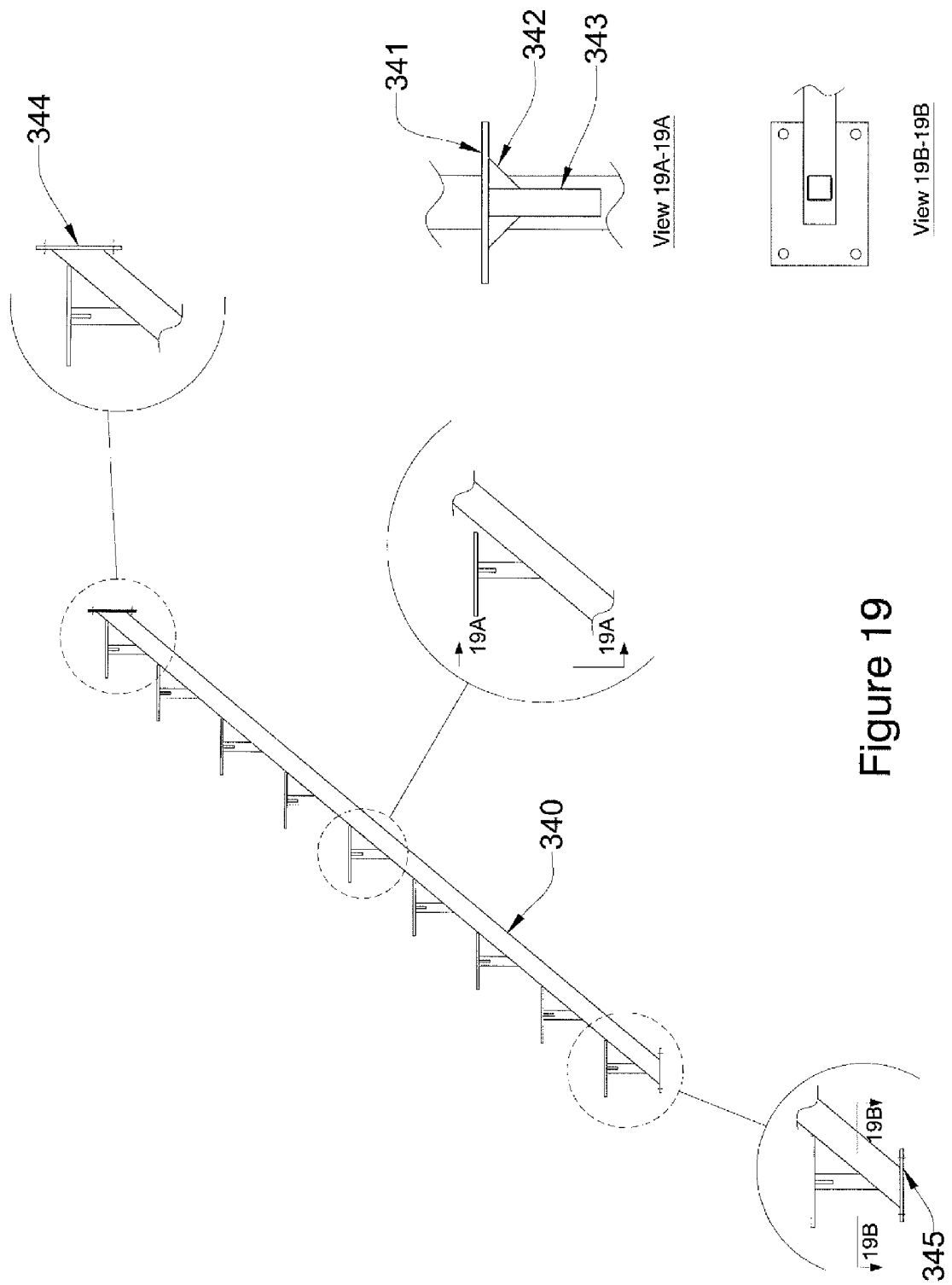
FIG. 19: Exploded view of typical staircase assembly.
Figure 20A:
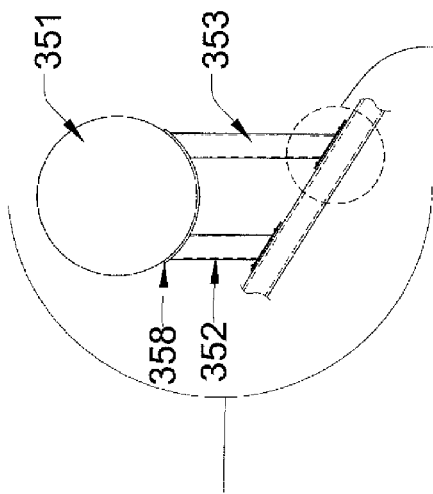
FIG. 20: Exploded view of typical water solar heating (solarium) system installation.
Figure 20B:
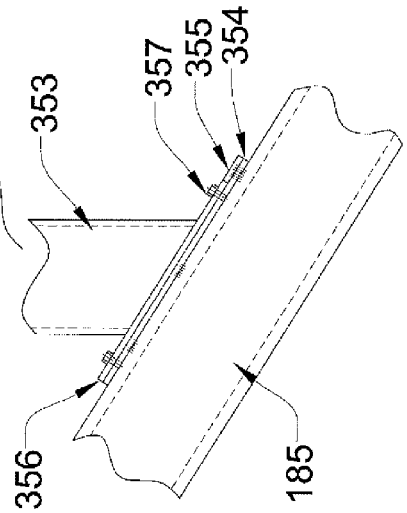
Figure 20:
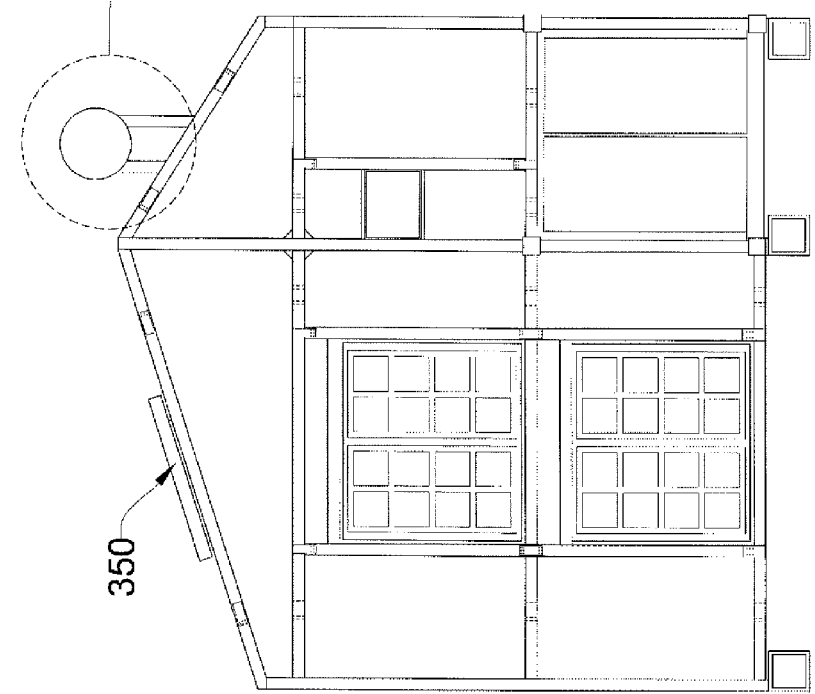
Figure 22:
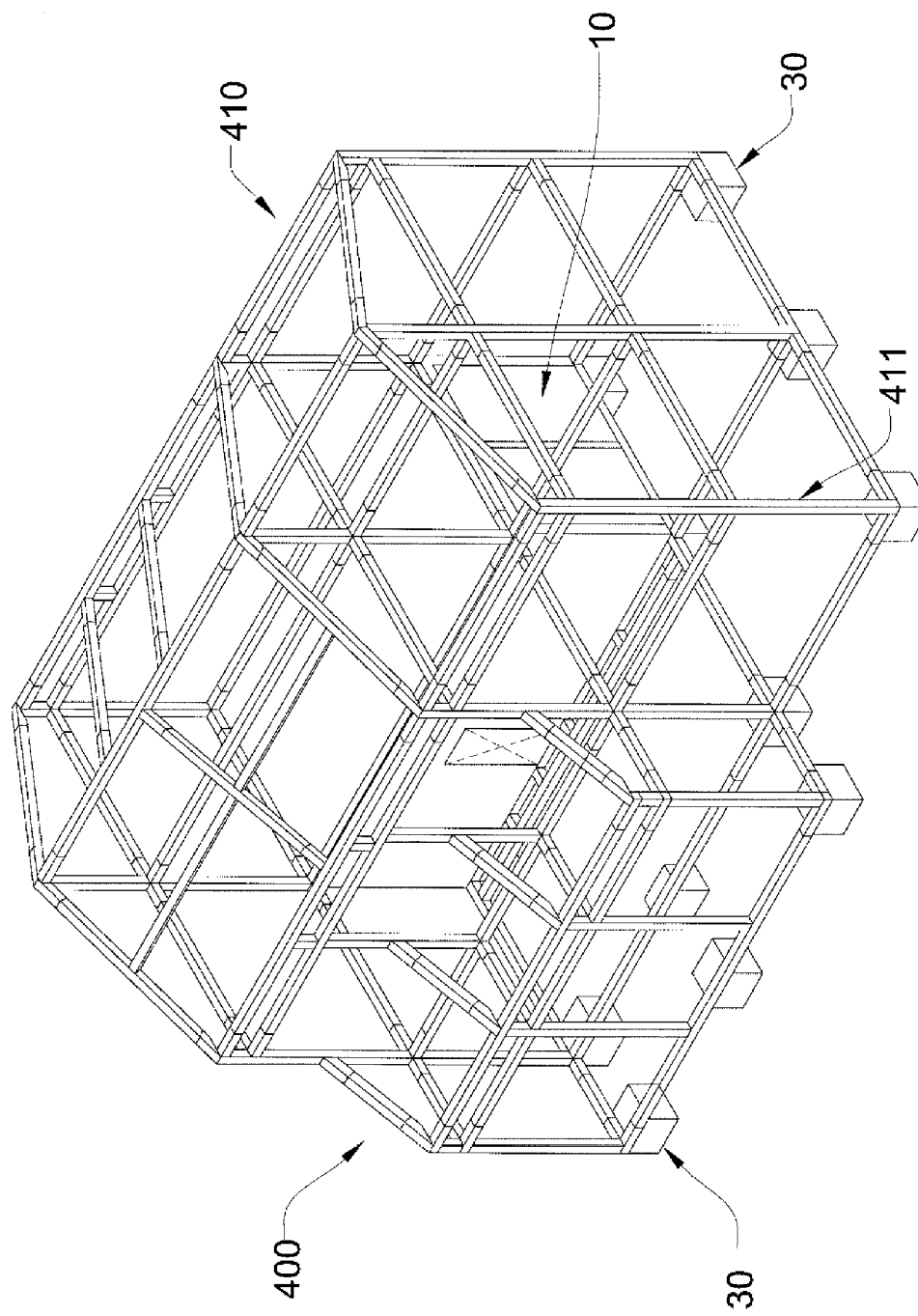
FIG. 22: Elevation view of examples of modular building extensions.
Figure 25:
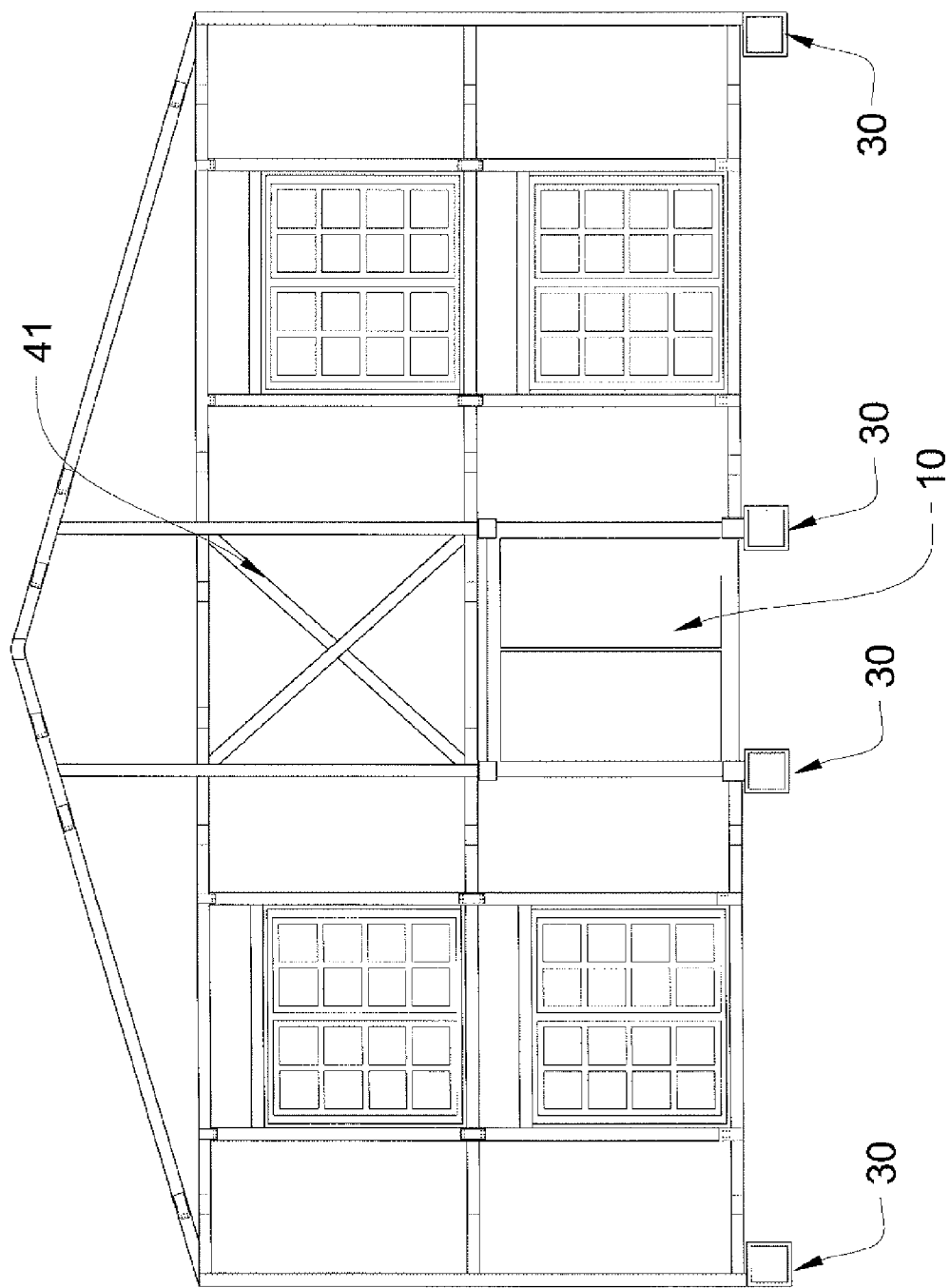
FIG. 25: Front view of Building 'extension' shown either side of the shipping container
Figure 26:
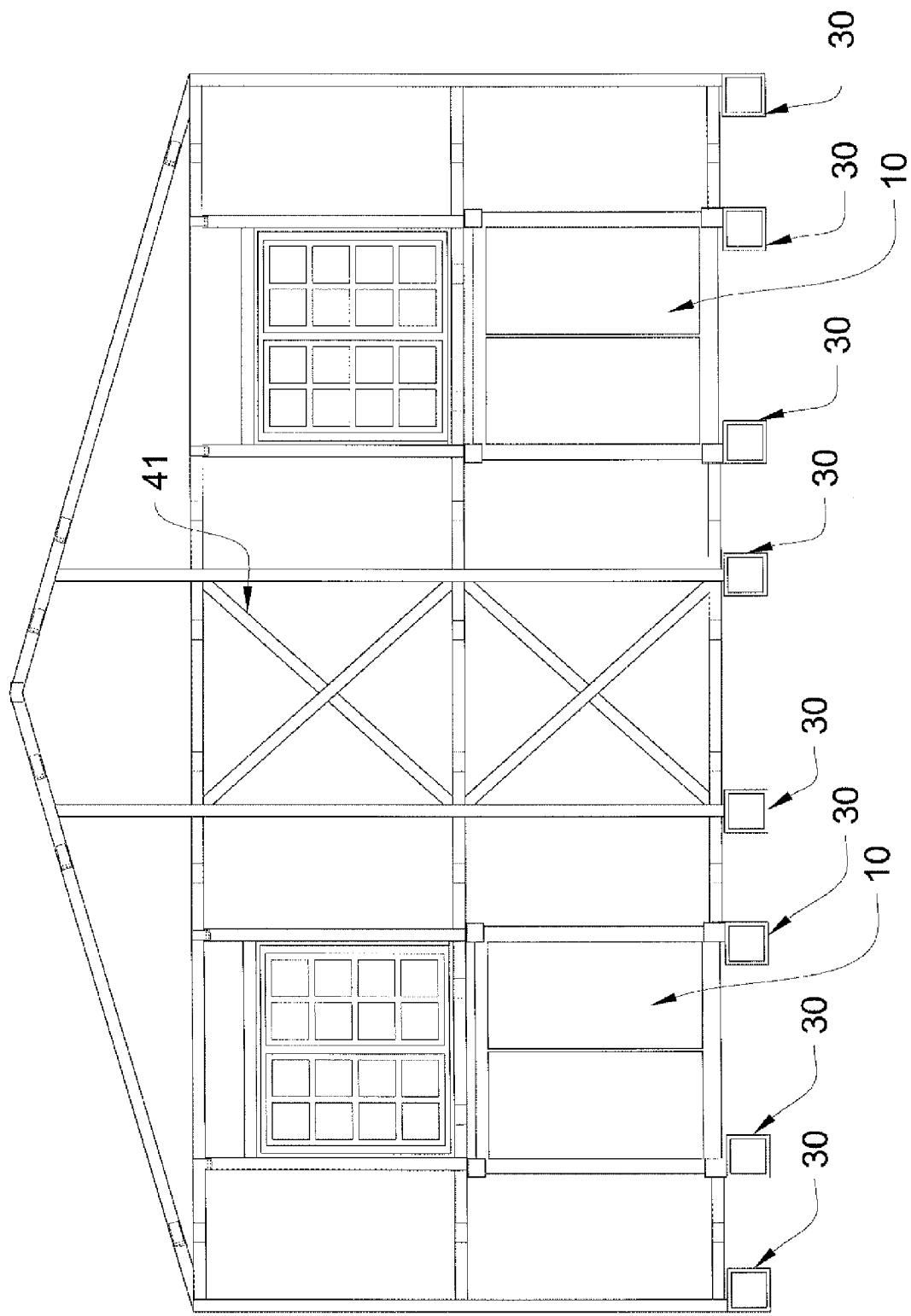
FIG. 26: Front view of example of 'Two container configuration' modular building.

The following description will refer, generally, to FIGS. '1' through '22'. The Building is described more fully herein with reference to the accompanying figures, in which preferred embodiments of the invention are shown. The Building may, however, be embodied in many different forms, some examples being shown in FIGS. '24' through to '26'. The examples should not be construed as limiting the invention described therein; rather, these embodiments are provided so that this disclosure will be thorough and complete and will fully convey the scope and intent of the invention to those skilled in the art. The members shown in the examples are typically straight for simplicity; these can be replaced with curved members with improved strength and aesthetic qualities.

It should be kept in mind that local modifications may be incorporated to accommodate the requirements of local building regulations and environmental conditions. For example building regulations and environmental conditions may require local modifications in earthquake prone regions, hot, cold, wet, or dry environments with respect to construction materials. Other factors as plumbing, electrical wiring, lightening strike, amongst others may also require local modifications governed by local Building codes or regulations.

Shipping container construction may differ slightly as the shipping container fabrication methods may change between manufacturers but, the pick-up points and specified geometry are fixed. There may, however, be subtle difference in the corrugations and the upper/lower corrugation attachment members.

Generally speaking, the Building is typically constructed using three basic joints, excluding the attachment to the container and some of the sidewall support structure. The three basic joints being: (i) horizontal/sloped beam attachment shown in FIG. '5'; (ii) floor, ceiling and roof beam attachment shown in FIG. '6'; and (iii) window and door support structure shown in FIG. '11'. In discussions below, the Building assembly will be described followed by a detailed description of the joints and interfaces.

The Building will be shipped as sub assemblies within at least one intact shipping container to the site where it will be erected. The shipping container will hold the basic construction materials necessary to assemble the Building including but not limited to, necessary structural elements, windows, doors, a plurality of tools that may be used for constructing the Building, construction instructions, among others. Certain basic building materials may be omitted due to space and weight restrictions for example, sand, cement, plasterboard, among others.

In the discussion below, reference will be made to many structural elements which are intended to be incorporated in the Building but which have not been illustrated in detail because they are well known in the art. Further, sills and beams may be composed of metallic, non metallic, a combination of metallic and non metallic, composite or any known or unknown synthetic material.

Weight reduction means will be incorporated where possible for example 'lightening' holes will be introduced where feasible in the steel tubular beams in the preferred embodiment. Provisions will be made for the installation of utilities.

In the preferred embodiment, the exterior walls are weather resistant. Also, in the preferred embodiment, the interior walls may be provided as panels or formed sheet metal studding to which panels and dry wall can be attached; the flooring may be provided as panels upon which finishing materials can be attached; the roof may be provided as panels to which water resistant material can be attached. Further, insulation may be either inside the interior or exterior walls floor and roof panels/members or will be sandwiched in between the interior and exterior panels/members or any combination thereof.

In one preferred embodiment, there is a means to insulate the Building using insulating paint or other, known or unknown, insulating material that can be painted, fastened or secured to a shipping container. The interior and exterior panels/members may be manufactured from natural or man-made materials or a combination of both and may include an inner and/or outer facing member spaced apart by studs and beams forming a frame.

At least one ISO shipping container is shipped containing the basic materials necessary to construct a Building. An example of an ISO shipping container (10) is shown in FIG. '1'. There are five standard lengths in general use for ISO shipping containers: 20-ft (6.1 m), 40-ft (12.2 m), 45-ft (13.7 m), 48-ft (14.6 m), and 53-ft (16.2 m). United States domestic standard containers are generally 20-ft, 40-ft, 48-ft and 53-ft (rail and truck). However, it should be noted that any shipping container, whether ISO or not, can be used for the portable, modular Building.

The shipping container will not be structurally modified prior to initial shipment. Modifications for the shipping container's structure may result in reduced structural integrity Also, in certain countries, a shipping container cannot be re-shipped, if it has been structurally altered. However, prior to shipment, the shipping container may be painted and marked out for the cut-outs (20), shown in FIG. '1', along with attachment locations for prefabricated doors and/or windows, among others.

A. Assembly of Building

The following method has proven to be the quickest and easiest method of construction. Assembly of the Building will consist of placing then securing the shipping container (10) on corner supporting blocks (30). The corner blocks can be, for example, concrete, steel frame, cinder blocks, among others. The blocks must be able to support the weight of the shipping container and the weight of the completed Building, its contents and users, at the construction site. Elevating the structure protects the structure and its inhabitants from rodent and/or bug infestation, mold, minor flooding due to rain or snow, among others. It should be noted each that structural member is both sized to meet the loading requirements and to fit inside the shipping container.

Once the shipping container is secured on the supporting corner blocks, the framework above and to the side of the container is secured in position as illustrated in exploded view shown in FIG. '4'. Four vertical members, (150) through (153), are attached on the top of the shipping container (10). One vertical member is attached at each corner fitting. The preferred means to attach the vertical members to the shipping container are shown in FIGS. '7' and '8'.

After the vertical members are positioned and secured in place, main structure support beams (160) through (167) are attached at the floor and ceiling level; this is followed by roof beams, (180) through (182). Main structure support beams (161) and (163) are attached via support bar (192) to the shipping container to reduce the un-supported span length. The support bar in joint (190) is detailed in FIG. '9'.

After the main structure support beams, (160) through (167), are secured in place, floor support beams, (255) through (260), shown in FIG. '12', are secured to the main structure support beams; this is followed by floor beams (271) or a floor panel frame (280). Both the floor beams and the floor panel frame are shown in FIG. '12'.

The foundation of the Building 'side' frame extension is started by attaching the lower horizontal side support members (168) through (170), shown in FIG. '4'. The lower corner container attachments (168) and (169) are attached the lower horizontal beam (170) then the assembly of the 'three' components is offered up to the container and attached to the container as shown in FIG. '3' joints (110) and (130), the container attachment (130) is described in detail by FIG. '7'. Next, referring to FIG. '4', two side vertical members, (154) and (155), are secured in position on the supporting blocks (30). After side vertical members (154) and (155) are secured, main structure support beams (171) through (190) are attached at floor and ceiling level on both floors; then roof beams (182) through (189) are attached to the assembled framework shown in FIG. '4'. Referring to FIG. '12', floor support beams (251) though (258) are secured to the main structure support beams as each level is assembled providing a working platform for the next floor above. The floor beams (271) or floor panel frame (280), both shown in FIG. '12' can also be added as each floor is assembled.

The sidewall support structure, shown in FIG. '15', is attached as shown by the details in FIG. '15'. The sidewall covers the containers corrugated side by adding the sidewall panels. Utility electric cables and water pipes are routed along the shipping container between the sidewall and the container corrugated side.

The assembly procedure is first to attach horizontal member (293) to the side and floor beams at top of the container, an example is shown in Detail '15D', then the vertical members (291) and (292) are then secured into place. Finally, the door surround 'H' Section (290) in bolted in position. Various details in FIG. '15' show the attachment methodology.

Sidewall supports (300), shown in FIG. '16', are then bolted, in situ, at their desired location around the Building. It should be noted that FIG. '16' only shows one sidewall support as an example, these members are placed where required to support dividing walls and doors depending on the internal configuration on the building.

Sidewall panels can be either pre-fabricated panels or panels attached to a studded framework, as discussed earlier. Angle (294) will be orientated on horizontal member (293) dependant upon the sidewall panel option; 'axial' direction shown in Section '15B-15B' as one example method of the securing the sidewall panels, this would be used to attach a pre-fabricated panel. Similar angles could be attached 'normal' to the axial direction of horizontal member (293) if required to support wooden or formed sheet metal studding to which panels are attached.

Window and door support structure is typically installed as detailed in FIG. '10'. Brackets (210) and (220) would be already in situ as they are part of the side member welded assembly (not show in FIG. '3' and '4' for clarity). FIG. '11' shows a typical bracket (210) assembly and attachment. Consequently, the window/door frame installation only requires an 'H' section frame (200), shown in FIG. '10', to be held in the correct location; fasteners are installed to secure the frame in position, at each of the four corners of the 'H' section frame. Windows/Door could be installed in frame (200) prior to attachment of (200) to the frame horizontal members (171) and (174).

Another type of window/door frame attachment can be seen in (240) FIG. '10' and '11'. In this type of frame attachment the frame is attached to a vertical side member. Provisions (203), shown in FIG. '10', are provided for a balcony rail attachment.

Glass panels can be installed on either side of the 'H' section frame forming a large window replacing the sidewall panel. A glass panel with a plastic, wooden, composite or metallic frame could be installed. For example, a Plastic frame being conventionally installed with screws fastening directly to the surrounding members, with reference to FIGS. '4' and '10' the plastic frame would be attached to (154) and (200) at either side and (174) and (171) at the top and bottom. The panels could be installed at any position around the building along with being used to form a complete glass wall divided only by the support members similar to shop windows. This would replace any external panels in this region.

Floor support beam installation has already been summarized in paragraph

The floor beams or frames rest on floor beams (251) through (260). A preferred embodiment is shown in FIG. '13' where the floor beams simply drop onto the support brackets welded on the Floor Beams (251) through (260). In another preferred embodiment a floor panel-welded frame, as detailed in FIG. '14', would be dropped into position resting on the welded support brackets on the Floor Beams (251) through (260). In the preferred embodiment press/chipboard is used to form the form the floor. Alternatively typical 'tongue and groove' or an alternative panel material could be used.

In the preferred embodiment interior support structure consists of brackets attached to the interior of the container with studding attaching to the brackets as shown in FIG. '17'. As the sidewall 'corrugations' of the shipping container can be damaged and/or deformed, (especially if a used container), the internal attachment provision is made by attach to the upper and lower structure of the container, which is less susceptible to damage.

Referring to FIG. '17', attachment brackets are welded or bolted in between the corrugations inside the shipping container (10). Note the shipping container corrugation and corrugation location varies from container to container therefore provision to either bolt or welded have been shown. These attachment brackets retain beams to which the interior panels/drywall is attached.

Alternatively, formed sheet metal studding can also be used for the attachment of the dry wall or plasterboard where similar bracket may be used to attach the formed sheet metal studding. In both options insulation can be added where required in the region between the container and the drywall/plasterboard.

The shipping container (10) window and door cut-out (20) surround 'reinforcement' generally consists of being completely surrounded using 'L' section steel which is also attached at the side to vertical members, the vertical member attachment to the container is detailed in FIG. '18'. Typically the cut-out in the corrugated wall is reinforced by 'Angle Iron' ('L' Shaped steel) or similar members fastened or welded to the 'high' or low' points of the corrugation, depending on which side (external/internal) of the wall the angle is attached. The angles are attached to the vertical support members (331) shown in FIG. '18'. This being fairly common practice used in container modification cut-out surround, therefore only the detail for the vertical member attachment to the container has been shown (FIG. '18').

In the preferred embodiment the stairs are attached on the inside of the shipping container, the stairs are detailed in FIG. '19'. The stairs are attached at the top via fasteners through plate (344) to a partitioning frame on the inside of the container and at the bottom to the container floor with one set of fasteners passing through plate (345), through the floor panel and the upper flange on one of the shipping container 'C' section steel floor support members. The stairs can be re-located to attach to the floor and ceiling support beams of the framework at the side of the container. This would require changing the length of the stair beam (340) to accommodate any changes in height. A reinforcing plate with at least two threaded fastener holes would be added in the required upper and lower attachment location to mate with stair upper/lower plate (344) and (345) at the respective stair location.

The general structure for the roof can be seen in FIGS. '3' and '4'. In the preferred embodiment there are short 'angle' sections welded on the top of (167), (178) and (182) which are used to secure wooden beams running parallel to beams (181) and (184). Plywood or chipboard panels are then attached to the wooden beams. A waterproof membrane is then attached to the roof panels followed by 'shingle' or 'tiles'. More supporting structure can be added using the same or smaller beams where slate or other conventional roof tiles may be installed. Shingle is the preferred roofing material due to weight and volume restrictions. However, local roofing materials may be utilized. While the roof is being constructed the solar panels, Heating tank and Heating tank supporting structure would be installed as shown in FIG. '20'.

In the preferred embodiment sidewall are constructed with the use of formed steel sheet 'C' section studding with chip/press board on the external side, dry wall on internal side, and insulation in the middle. Formed sheet metal studding is currently available in Europe and North America for commercial and residential buildings. A composite or wooden stud may also be used along with a different material for the outer/inner panels.

In another preferred method hot pressed bonded assembly can be used. For example, plywood sheets either side of a wooded studded frame with cardboard corrugation providing stiffness, being sandwiched between the two plywood sheets. The assembly is constructed with nails/staples and glue with completed assembly being hot bonded together by placing under the hot press. This method of construction is one method used to manufacture typical house interior doors.

The external finish should meet any local building regulations, shall suite the local environmental requirements and be aesthetically pleasing. In the preferred embodiment siding, logs, tiles, brick/stone effect panels or any combination can be attached to the outside of the Building. Wooden strips are added to pack the finishing panels/members off the steel framework shown in FIGS. '3' and '4' provide a void in which insulation can be added if required. Depending on the finishing material a waterproof membrane may be required between the interior panels and the finishing material. To provide an example a finished mobile home, an 'Clad' exterior is shown in FIG. '21'.

After the external finish of the Building has been added the construction is completed by installing windows (not already installed), balcony rails, routing the plumbing and electrical wiring, installing drywall or plasterboard where required on the ceilings and walls, and internal doors. The kitchen and bathroom would be installed then finishing materials for example Skirting board, paint, tiles, carpet etc. would be used to complete the modular home.

The Building may be modified to suite local regulations or requirements for example; Earthquake prone regions may require additional and or re-location of support members shown in FIGS. '3' and '4'. Gusset plates (40) as shown in FIG. '2' and diagonal braces (41) as shown in FIGS. '25' and '26' may also be required. A particular foundation for supporting blocks (30) in FIG. '3' may be required. Lightening strike provisions may be incorporated by adding an insulated cable from a probe on the roof to the ground. The reinforcing plates used to support attachment of joining members, one example being item (121) shown in FIG. '6', may extend level or beyond the joint, may extend partially or completely around the tube, may be located on the inside of the tube section, where it may be normal to the web, may extend to attach to two or all the interior webs or any combination aforementioned. The attachment reinforcement shall be sized to suit the loading requirements.

In the preferred embodiment shown in FIG. '22', the basic steel frame is extended to provide more living space. There are two extension options; 'Side extension' (400) and 'end extension' (410). These are shown for exemplary purposes. Note item (411) is the same as item (154) in FIG. '4'. Where required, provisions shall also be provided for partial or complete extension of the basic structure examples of which being a balcony, porch, window bay(s), additional room or rooms, conservatory, kitchen extension, a modification to the roofed area amongst others. There are multiple 'extension' configurations, the extensions to the Building shall not be limited to those provided as example.

In the preferred embodiment, the Building also has a means to be deconstructed and relocated once it has been fully constructed on site. It will be possible to move the modified shipping container utilizing the original pick-up points. Reinforcement will be in place around the cut-outs to provide structural integrity to the modified shipping container. The steel framework has removable fastened joints, allowing the original 'as shipped' pick-up points to be used Depending upon the internal configuration of the modified shipping container the framework may have to be transported separately due to damage to the installed interior if removed. With reference to FIG. '10' the doors and windows are installed in the support frames, these can be removed with the doors and Windows remaining inside the support frames by simply un-bolting the support frame from the structure to which it is attached. The interior and exterior walls along with the Roof may be dismantled but may require cosmetic repair while being reinstalled at the new location. A quick change option where the interior and exterior walls are removable will require more than one Container for original shipment, due to space limitations.

B. Detailed Description of the Invention Figures

FIG. '1' shows the shipping container (10) mounted on support blocks (30) with example cut-outs (20) representing window and door locations. The windows and doors shown in FIG. '1' are for illustration purposes only. Sizes, types and locations of doors and windows can be changed depending on the requirements of the user.

In the preferred embodiment triangular shaped 'gusset' plates (40) are welded in several corner locations providing stiffness and shear load transfer capability, depending on the design requirement and local Building regulations gusset plates, diagonal struts (41) (Ref. FIG. '25' and '26') and any combination of both may be added to provide structural integrity.

FIG. '2' shows a front and side view of a preferred embodiment is shown along with several 'joint' examples. The framework is built above and to the side of the container (10).

FIG. '3' shows an isometric view of a preferred embodiment along with several 'joint' examples. A typical horizontal/sloped beam attachment joint (100) is detailed in FIG. '5', roof beam attachment joint (120) is detailed in FIG. '6'. Framework construction is shown above and to the side of the container.

There are three typical attachments to the container (10), the first is made by fastening the container to the lower 'C' section as shown in joint (110) FIG. '3', the second is by attaching to the container corner fitting as shown in joints (130), (140) in FIG. '3' and detailed in FIG. '7'. The third container attachment is made by attaching the horizontal cross member (161) above the container (10) to the container (10) as shown in joint (190) FIG. '9'. The attachment to the container (10) lower 'C' section is discussed in paragraph [650].

FIG. '4' shows an 'exploded' isometric view of a preferred embodiment along with numbering of the various structural members used to construct the modular Building.

FIG. '5' shows the typical horizontal 'splice' beam attachment. In the preferred embodiment, the Horizontal Beam (172) attachment (100) is comprised of two external Splice Plates (101) and (102) with at least two fastener holes drilled (six shown) in each of the Splice Plates (101) and (102). These plates are typically welded at each end of the horizontal members.

On the mating part (154) (Refer to FIG. '4'), Internal Doublers (104) are welded on the inside of the tube and Support Plate (105) is welded underneath. Internal Doublers (104) have at least two threaded holes drilled matching the clearance holes drilled in external Doublers (101), (102), (103). The Internal Doublers (104) are required to provide additional threads for the attaching fasteners.

Support Plate (105) allows the cross member (172) to be held in position while the fasteners are installed during assembly, it also provides support along with the fasteners.

Referring to FIG. '5A', if the floor frame (280) option, as detailed in FIGS. '12' and '14', is to be installed, the 'External Doubler' plate (102) will have to be reduced in height to that of (103) where the reduced height is defined by the dotted line, to eliminate a fouling condition with floor frame (280).

FIG. '6' shows the typical horizontal beam 'end' attachment joint (120) in a preferred embodiment. The example shown is for a Roof Beam attachment, the same methodology is used for the floor beam attachment and other locations where a similar configuration exists.

The joint being described is between structural side member 'Roof Beam' (184) and 'Roof Beam' (187). Roof Beam (187) end attachment (120) is comprised of two Angles (122) welded to the end of Beam (187). A 'Doubler Plate' (121) is welded to wall of Beam (184). Threaded holes are added through Doubler (121) and Beam (184) common to holes (123) in Angles (122). The welded assembly (187) and Angles (122), is then offered in the desired location and fasteners are installed to secure the joint. A support plate (not shown) can be added, welded to the underside of Beam (184) to rest the Roof Beam (187) while the fasteners are being installed. At least two fasteners (one each angle) are required, six fasteners (three either side) are shown in the example joint.

Referring to FIG. '3' Joint (110), the same methodology is used; attaching two Angles (122) to the end of the Floor Beam (170) shown in FIG. '4', where holes (123) would be common to clearance holes drilled in the lower horizontal 'C' section of the shipping container (10). Fasteners (nut and bolt) are then installed to secure the Floor Beam (170) at the four locations shown, to shipping container (10).

FIG. '7' shows the container attachment. In the preferred embodiment, attachment to the shipping container is carried out by utilizing the existing slots on the shipping container. The ISO standard shipping container has a separate standard covering the corner boss definition, the location and geometry is such that the 'Slots' are in the same location for each shipping container. The container can then be lifted using standard lifting equipment such as cranes and fork lifts etc. There are two preferred attachment methods. Option 1 is preferred as there is limited space inside the Container 'Corner Boss' and as Option 2 installation is time consuming.

In option 1 the attachment to the shipping container (10) is as shown in FIG. '7A', where an End Plate (131) is welded to the end of the Horizontal Beam (168), the End Plate (131) has a 'Boss' (132) welded in the required location for alignment. The Boss (132) is profiled to mate with the Slot in the container, noting the slot size differs around the container. The Boss (132) has a clearance hole through which a threaded portion of the retainer (133) passes. The Retainer (133) consist of a threaded rod welded to a flat plate, the plate has a stiffener welded on the back to provide bending stiffness for the retainer. The installation is done by inserting the retainer (133) into the slot of the container then rotating 90 degrees (see FIG. '8'), the threaded portion of retainer (133) is then inserted through the hole in Boss (132), a Nut and Washer (139) and (138) are then passed through a slot in the Horizontal Beam (168) and attached to Retainer (133), the Nut being tightened by a socket passed through the slot in (168).

In option 2 the attachment to the shipping container (10) is as shown in FIG. '7D', where an end Plate (134) is welded to the end of the Horizontal Beam (168), the End Plate (134) has a 'Boss' (135) welded in the required location for alignment. The Boss (135) is profiled to mate with the slot in the container. There are two threaded rods (threaded and welded on the inner face) installed in Boss (135). The whole assembly is offered into position, located in the slot on the container and is retrained by means of Plate (137), washer (138) and nut (139) which are passed through the adjacent slot in the container as shown in FIG. '7C'

A mechanical locking devise, for example; Tab Washer, Nylon Lock-Nut or an additional Nut for locking amongst others may be provided and a small tack weld may be added to the plate/container in accessible locations of to ensure the plate remains attached. The weld should be in accessible locations so it can be easily removed in the event of the container being re located.

FIG. '8' shows the installation of the Retainer detailed in Option 1 FIG. '7'.

FIG. '9' shows Joint (190), a typical attachment of a horizontal cross member on top of the container (10) to the container (10). Here there is a bar (192) with a threaded hole on the underside to which there is an 'L' Shaped Bracket (191) welded on the top. The Bar/Bracket assembly is then welded to the Horizontal Member (161) in this example, a clearance hole is drilled in the upper plate of the container (10) and a Bolt (193) inserted from the underside to secure Beam (161) to the container (10) as shown in View '12'.

FIG. '10' shows the general Door and window locations in the preferred embodiment. FIG. '10' shows patio doors (230) being installed into 'H' Frame (200) which is attached to the Building frame via fasteners attached through brackets (210) and (220) into 'H' Frame (200). Further description will be given under FIG. '11' description. 'H' Frame (200) has four internal doublers (201) welded on the inner surface of the Tube section, one at each corner of the vertical members. The Doublers (201) will have at least two threaded holes mating with those existing in attachment Brackets (210) and (220) at the respective attachment location. Item (203) is a small plate welded to the Frame (200) used to attach the balcony rail. There are at least two 'attachments' (203) on each vertical member of Frame (200). Note 'attachments' (203) can also be added to the horizontal member for example Beam (171) in FIG. '3'. Item (240) shows the window frame attachment which is described in FIGS. '11' and '23' The window installation is discussed in paragraph [200], were provisions can also be attached to the Steel frame to install Glass panels FIG. '11' shows a typical joint for the door and window 'H' Frame (200) in the preferred embodiment. FIG. '11B' shows 'Bracket assembly' (210), which consist of Plates (211) through (213), welded together. Vertical plate (213) will have at least two holes (six shown) for which fasteners will be inserted. FIG. '11A' shows 'Bracket assembly' (210), welded to Horizontal member (171) with 'H' Frame (200) in position where fasteners will be inserted to secure 'H' Frame (200) in position. Only Bracket (210) has been described, Bracket (220) is attached similarly with provisions for fasteners above and below the horizontal member.

FIG. '12' shows a typical Floor Beam configuration in the preferred embodiment. Item (250) detailed further in FIG. '6', is the same joint used throughout the Floor Beam attachment. Two Options, '1' (271) and '2' (280) are shown where Option '1' (see FIG. '13') consists of 'Floor Beams' being dropped in position, secured in place by brackets welded to the Floor Beams. Option '2' (see FIG. '14') is a Floor Frame which is dropped in position supported by FIG. '13' shows a Floor Beam configuration. There are two preferred embodiments. Option 1 is a wooden or composite Floor Beam (272), Items (271) attached (bonded/fastened) at the upper and lower edges as shown, are formed sheet metal 'C' Sections attached to the Floor Beam, these assemblies form individual Beams that are then 'Slotted' into Bracket (270) which is a 'U' Section welded to the Horizontal Structural Member (171) (Refer to FIG. '4'). The same Floor Beam is used throughout the Modular Building on each floor to form the support for the floor panels.

FIG. '14' shows a Floor Panel configuration; Option 2 in the preferred embodiment. Item (280) is a Steel Tubular frame welded together. Item (281) shows a 'L' Section (Angle Iron) which forms the support for the Frame (280). The 'L' Section (281) is welded to the Main Structural Floor Beam, the Floor Frames (280) rest on the Angle sections (281). Either a tack weld or a self tapping bolt can be used to structure the Frames in position.

FIG. '15' shows the Sidewall support frame to which panels are attached covering the side of the container (10). In the preferred embodiment the plumbing and electrics will be routed behind this panel to the front and back of the modular Building.

The Framework is constructed using a Tubular frame providing a support for studding or panels. The framework is attached to the Floor Beams and Horizontal members above the container as shown in Details '15C' to '15F'. The typical 'upper' Floor Beam attachment is via angles welded to the upper sidewall support member (293), with fasteners attaching to the floor beams where doublers have been welded with threaded holes, see Detail '15D'. The Vertical members are attached to Angles welded to (293) and (170) at the top and bottom respectively. Doublers are welded on the inside of the Vertical members (290) through (292) which have threaded holed mating with the holes in the angle attached to the Horizontal members (293) and (170), as shown in Details '15E' and '15F'.

There are two preferred embodiments: the first being the use of formed sheet metal studding, which will be referred to as option 1; and the second is a Hot Pressed panel which will be referred to as option 2. FIG. '15' shows provisions for both options.

In FIG. '15', Option 1 would be installed in between (290) and (291) where formed sheet metal 'U' sections would be attached at the upper and lower horizontal beam are used to support the Formed sheet metal 'C' Section or wooden dry wall studding, insulation and drywall would be installed as in the conventional house construction means.

Option 2 requires the installation of several Angle sections (294) to be welded to the support structure as shown in Section '15B-15B', holes are drilled in the Angles and used to secure the sidewall panels. The 'H' Frame (290) provides provisions for a door to be installed.

FIG. '16' shows a typical vertical Interior Sidewall support member. The attachment is similar to that of the horizontal beams shown in FIG. '6' where angles are welded to the end of the vertical member (300) with a Doubler Plate (302) welded to the connecting horizontal member (161). Holes (303) are common in the Angles (301), Doubler Plate (302) and member (161) with a clearance hole in Angles (301), and threaded holed in Doubler Plate (302) and member (161).

FIG. '17' shows the Container Interior Sidewall and Ceiling support structure. Shown in FIG. '17A' through '17C' are typical 'brackets' used to attach wooden (shown in example) or formed metallic sections used to attach drywall to the interior of the container. The Brackets can be made from box section tube with one side cut away to form a 'C' Section. Attachment plates (322) and (326) are welded were required and used to attach the brackets (321) and (324) to the container. Typical holes (323) are used to attach the member (328) and (329) to the brackets FIG. '18' shows the Container Cut-out reinforcement Vertical members. Cut outs made in the shipping container (10) for doors, windows as per examples shown in FIG. '1', or other openings will be supported by local reinforcement. Referring to FIG. '18', vertical reinforcement member (331) will be attached to the shipping container (10), as shown in FIG. '18B'. End Plate (332) trimmed to mate with the container (10) corrugations is welded to Vertical member (331). Holes (333) are drilled in End Plate (332) through which fasteners can be passed matching with holed drilled in the container (10). If it is not practical to pass fasteners through the container (10), plate (332) can be welded to container (10). Horizontal support can be bolted or welded to the Vertical member (331) once installed. The purpose of the reinforcement (330) is to maintain the structure integrity of the shipping container (10) once a cutout has been introduced.

FIG. '19' shows stairs. In the preferred embodiment the stairs will be included in the modular home. The simple design of the Stairs is shown in FIG. '19'. The Stairs may be located either inside the container or the adjoining room, support structure will be modified to suit. The construction of the stairs is a welded assembly using tube and plates. The main member is Tube (340) to which plates (344) and (345) are welded at the top and bottom respectively for attachment. The plates have fastener clearance holes as can be seen in View 'S2-S2' through which attachment fasteners will be installed to secure the stairs in place. Vertical stair supports (343) which have a plate (341) welded on the top, to which a step finishing material may be added and 'triangular gusset plates (342) welded either side providing support for the step. A banister may be attached to an adjacent sidewall or attached to the main Tube (340) by fasteners or welding.

FIG. '20' shows the Water Heating Solar Panel and Tank installation. Because the Building can be used in any location, it has a means to harvest, store and/or purify potable and/or non-potable water. In the preferred embodiment, solarium panels (350) are used with a solarium tank (351), as shown in FIG. '20'. The Building will also have a means to harvest, store, and distribute energy from natural resources including, but not limited to, either, all or any combination of solar, wind, hydroelectric, tidal, geothermal power, among others. In the preferred embodiment solar energy is collected using solar panel (350), and used to heat water which is stored in Tank (351) shown in FIG. '20'. Solar electric panels would also be mounted on the roof.

The Solar tank requires structural attachment provisions, Support members (352) and (353) have welded base plates (356) which are fastened to Roof Beam (185) and (186) (refer to FIG. '4' for beam numbering). Beam (185) is shown in FIG. '20B'. The Roof Beam (185) has a Doubler Plate (354) and Stop plate (355), welded to the top of the beam. The welded a Stop plate (355) is there to aid in the installation and provide addition support. The Base plate (356) is fastener in location as shown in FIG. '20B' with fasteners (357). At the Upper end of the Support members (352) and (353) there is a formed sheet profiled to accept the tank shape, welded or fastener to the Support members (352) and (353).

FIG. '21' shows a completed basic structure. The figure shows an example of the finished modular Building in the preferred embodiment. The views show a log or siding finish along with Balcony rails and the Solar water heating systems installed.

FIG. '22' shows a completed basic structure with example extensions. The figure shows example extensions to the front (400) and end (410) of the modular Building. This is intended to give an example of how the structure can be extended; there are a multitude of configurations to which the modular Building may be extended one either end or side, there are different roof configurations, balcony's and additional floors.

FIG. '23' shows an example 'Typical' joints. The example joints have been added to show the joints that would typically be used to construct the extended framework shown in FIG. '22'.

FIG. '24' shows a garage or single story Building. The Figure shows an example of a single story Building that could be used as a garage, workshop or single story house. If a garage provisions can easily be added to include such things as an electric garage door FIG. '25' shows a modular 'extension' for the building on either side of the shipping container. Diagonal brace (41) is shown installed providing shear resistance for the framework, this is an example, the diagonal braces may be added on the other configurations discussed although may not be required if the internal or external panels can be shown to meet the required shear resistance.

FIG. '26' shows two container configuration where framework is built around and above two containers (10), the use of two containers may provide the transportation of additional finishing materials transported inside the containers.

The Building will have at least one room adjacent to or above the shipping container. The figures showing elevation diagrams are showing possible architecture of the Building. It should be noted that a person with ordinary skill in the art would not deem FIGS. '1', '2', '3', '7', '10', '12', '16', '20', '21', '22', '24', '25' and '26' as an exclusive showing of possible architecture. Further, the windows and doors etc. shown on FIGS. '1', '2', '3', '7', '10', '12', '16', '20', '21', '22', '24', '25' and '26' are for illustration purposes only. Sizes, types and locations of doors and windows can be easily changed.

What is claimed:

1. A transportable, modular building comprising:

at least one rectangular, parallelepiped shipping container, the shipping container comprising: frame members defining an outer periphery of the shipping container, the frame members connected at each corner of the shipping container by corner fittings; walls extending between frame members along all sides of the shipping container; and a door opening at one end of the shipping container; and a plurality of structural members forming at least one room adjacent the shipping container;

the shipping container and structural members combining to form the modular building;

wherein at least one of the structural members is directly connected to at least one of the corner fittings;

wherein any cutouts for windows or doors in the shipping container walls are reinforced by reinforcing members connected to the walls and surrounding the cutout;

wherein the shipping container is sized to accommodate the plurality of structural members;

wherein the shipping container is suitable for national and international conveyance using conventional transportation networks; and wherein the at least one adjacent room is not another shipping container.

2. The transportable, modular building of claim 1, wherein the structural members include one or more of: generally straight beam members, curved beam members, vertical beam attachments, horizontal beam attachments, sloped beam attachments, floor beam attachments, roof beam attachments, window supports, door supports.

3. The transportable, modular building of claim 1, wherein the shipping container is a Series 1 Freight container and meets at least the structural requirements specified in ISO 1496-1 1990(E).

4. The transportable, modular building of claim 1, further comprising a means to harvest, store, and distribute energy from any combination of solar, wind, hydroelectric, tidal, and geothermal power.

5. The transportable, modular building of claim 1, further comprising a means to harvest, store, and/or purify potable or non-potable water.

6. The transportable, modular building of claim 1, wherein the shipping container is the structural base of the modular building.

7. A method of producing a transportable, modular building, comprising:

providing at least one rectangular, parallelepiped shipping container, the shipping container comprising: frame members defining an outer periphery of the shipping container, the frame members connected at each corner of the shipping container by corner fittings; walls extending between frame members along all sides of the shipping container; and a door opening at one end of the shipping container;

loading the shipping container with a plurality of structural members and tools for assembling or disassembling the members;

transporting the loaded shipping container via conventional transportation networks to a building site;

unloading the structural members and tools after arrival at the building site;

constructing at least one room adjacent the shipping container from the plurality of structural members, wherein at least one of the structural members is directly connected to at least one of the corner fittings;

wherein any cutouts made in the shipping container walls before transportation are reinforced by reinforcing members connected to the walls and surrounding the cutout; and wherein the at least one adjacent room is not another shipping container.

8. The method of producing a transportable, modular building of claim 7, wherein the structural members include one or more of: generally straight beam members, curved beam members, vertical beam attachments, horizontal beam attachments, sloped beam attachments, floor beam attachments, roof beam attachments, window supports, door supports.

9. The method of producing a transportable, modular building of claim 7, wherein the shipping container is a Series 1 Freight container and meets at least the structural requirements specified in ISO 1496-1 1990(E).

10. The method of producing a transportable, modular building of claim 7, further comprising a means to harvest, store, and distribute energy from any combination of solar, wind, hydroelectric, tidal, and geothermal power.

11. The method of producing a transportable, modular building of claim 7, further comprising a means to harvest, store, and/or purify potable or non-potable water.

12. The method of producing a transportable, modular building of claim 7, wherein the shipping container is the structural base of the modular building.

* * * * *